(12) United States Patent
Andle et al.

(10) Patent No.: US 9,952,388 B2
(45) Date of Patent: Apr. 24, 2018

(54) NANO-SCALE CONTINUOUS RESONANCE TRAP REFRACTOR BASED SPLITTER, COMBINER, AND REFLECTOR

(71) Applicant: Shalom Wertsberger, Rochester, NY (US)

(72) Inventors: Jeffrey C Andle, Falmouth, ME (US); Shalom Wertsberger, Rochester, NY (US)

(73) Assignee: Shalom Wertsberger, Rochester, NY (US)

( * ) Notice: Subject to any disclaimer, the term of this patent is extended or adjusted under 35 U.S.C. 154(b) by 0 days.

(21) Appl. No.: 14/426,756

(22) PCT Filed: Sep. 9, 2013

(86) PCT No.: PCT/US2013/058823
§ 371 (c)(1),
(2) Date: Mar. 8, 2015

(87) PCT Pub. No.: WO2014/043041
PCT Pub. Date: Mar. 20, 2014

(65) Prior Publication Data
US 2015/0301275 A1  Oct. 22, 2015

Related U.S. Application Data

(63) Continuation-in-part of application No. 13/831,575, filed on Mar. 14, 2013, now Pat. No. 9,112,087, and (Continued)

(30) Foreign Application Priority Data

Dec. 14, 2012  (GB) .................................. 1222557.9

(51) Int. Cl.
*G02B 6/293* (2006.01)
*G02B 6/12* (2006.01)
(Continued)

(52) U.S. Cl.
CPC .......... *G02B 6/293* (2013.01); *G02B 6/4215* (2013.01); *G02B 6/12007* (2013.01);
(Continued)

(58) Field of Classification Search
CPC .... G02B 6/0283; G02B 6/293; G02B 6/4215; G02B 6/12007; G02B 6/1228; G02B 6/4204; G02B 6/4298
See application file for complete search history.

(56) References Cited

U.S. PATENT DOCUMENTS

| 2,433,368 A | 12/1947 | Johnson et al. |
| 2,992,587 A * | 7/1961 | Hicks, Jr. ................ G02B 6/06 362/554 |

(Continued)

FOREIGN PATENT DOCUMENTS

| GB | 1416154 | 12/1975 |
| GB | 24584526 | 4/2012 |

(Continued)

OTHER PUBLICATIONS

Haifeng Hu, Dengxin Ji, Xie Zeng, Kai Liu & Qiaoqiang Gan, "Rainbow Trapping in Hyperbolic Metamaterial Waveguide", "Nature.com", Feb. 13, 2013, Volume Sceintific Reports 3, No. 1249, Publisher: Nature Publishing Group, a division of Macmillan Publishers Limited. Creative Commons.

(Continued)

*Primary Examiner* — Peter Radkowski
(74) *Attorney, Agent, or Firm* — Shalom Wertsberger; Saltamar Innovations

(57) ABSTRACT

A tapered core waveguide which may be configured as a spectral component splitter, a spectral component combiner, and various combinations thereof including a reflective mode of operation. The tapered core waveguide has an aperture and cladding, and is dimensioned such that radiant
(Continued)

energy admitted into the core via the aperture and having at least two spectral components would be emitted via the cladding at a location dependent on its frequency and/or its polarization, and that a plurality of spectral components injected to the core via the cladding will be mixed and emitted via the aperture.

20 Claims, 11 Drawing Sheets

Related U.S. Application Data a continuation-in-part of application No. 13/685,691, filed on Nov. 26, 2012, now Pat. No. 8,530,825, and a continuation-in-part of application No. 13/726,044, filed on Dec. 22, 2012, now Pat. No. 8,532,448.

(60) Provisional application No. 61/786,357, filed on Mar. 15, 2013, provisional application No. 61/801,431, filed on Mar. 15, 2013, provisional application No. 61/801,619, filed on Mar. 15, 2013, provisional application No. 61/724,920, filed on Nov. 10, 2012, provisional application No. 61/723,832, filed on Nov. 8, 2012, provisional application No. 61/723,773, filed on Nov. 7, 2012, provisional application No. 61/718,181, filed on Oct. 24, 2012, provisional application No. 61/713,602, filed on Oct. 14, 2012, provisional application No. 61/701,687, filed on Sep. 16, 2012.

(51) Int. Cl.
  *G02B 6/122*  (2006.01)
  *G02B 6/42*  (2006.01)

(52) U.S. Cl.
  CPC .......... *G02B 6/1228* (2013.01); *G02B 6/4204* (2013.01); *G02B 6/4298* (2013.01)

(56) References Cited

U.S. PATENT DOCUMENTS

| | | | |
|---|---|---|---|
| 3,422,527 A | 1/1969 | Gault | |
| 4,042,417 A | 8/1977 | Kaplow et al. | |
| 4,076,378 A * | 2/1978 | Cole | G02B 6/4298 385/115 |
| 4,251,679 A * | 2/1981 | Zwan | H01L 31/04 136/244 |
| 4,332,973 A | 6/1982 | Sater | |
| 4,358,770 A * | 11/1982 | Satoh | H01Q 13/0208 343/772 |
| 4,409,422 A | 10/1983 | Sater | |
| 4,496,876 A | 1/1985 | Young | |
| 4,680,558 A * | 7/1987 | Ghosh | H01Q 13/0216 333/21 R |
| 4,842,357 A * | 6/1989 | Doneen | 385/12 |
| 4,923,276 A * | 5/1990 | Wells | G02B 6/06 244/3.16 |
| 4,932,032 A * | 6/1990 | Koch | G02B 6/1228 372/45.01 |
| 5,060,119 A * | 10/1991 | Parthasarathy | G02B 6/0096 362/565 |
| 5,192,863 A * | 3/1993 | Kavehrad | G02B 6/4204 250/227.24 |
| 5,343,542 A * | 8/1994 | Kash | G02B 6/12007 372/45.01 |
| 5,375,178 A * | 12/1994 | Van Der Tol | G02B 6/12007 385/11 |
| 5,526,449 A * | 6/1996 | Meade | B82Y 20/00 385/1 |
| 5,784,507 A | 7/1998 | Holm-Kennedy | |
| 5,930,433 A | 7/1999 | Williamson et al. | |
| 6,328,932 B1 * | 12/2001 | Carter et al. | 422/82.06 |
| 6,366,365 B1 | 4/2002 | Williamson | G02B 6/12002 250/208.4 |
| 6,374,024 B1 * | 4/2002 | Iijima | G02B 3/0012 257/E27.147 |
| 6,628,242 B1 * | 9/2003 | Hacker | H01P 1/2005 333/248 |
| 6,819,861 B2 * | 11/2004 | Ota | G02B 6/08 250/227.31 |
| 6,919,862 B2 * | 7/2005 | Hacker | H01P 1/2005 333/248 |
| 6,992,639 B1 * | 1/2006 | Lier | H01Q 13/025 343/786 |
| 7,397,977 B2 * | 7/2008 | Hashimoto et al. | 385/14 |
| 7,483,615 B2 * | 1/2009 | Mihailov | C03B 37/15 385/125 |
| 7,526,167 B1 * | 4/2009 | Minelly | G02B 6/03633 359/341.3 |
| 7,623,745 B2 * | 11/2009 | Podolskiy | B82Y 20/00 385/123 |
| 7,799,988 B2 | 9/2010 | Cutler | |
| 7,902,453 B2 | 3/2011 | Dutta | |
| 7,943,847 B2 | 5/2011 | Kempa et al. | |
| 7,999,174 B2 | 8/2011 | Moslehi | |
| 8,012,382 B2 | 9/2011 | Kim et al. | |
| 8,078,020 B2 * | 12/2011 | Rasras | G02B 6/305 385/129 |
| 8,290,318 B2 | 10/2012 | Vasylyev | |
| 8,502,972 B2 * | 8/2013 | Himmelhaus | G01N 21/648 356/300 |
| 8,530,825 B1 | 9/2013 | Andle et al. | |
| 8,532,448 B1 | 9/2013 | Andle et al. | |
| 8,547,639 B2 | 10/2013 | Watanabe et al. | |
| 8,594,476 B2 | 11/2013 | Shkunov | H01S 3/06708 385/123 |
| 9,112,087 B2 | 8/2015 | Wertsberger et al. | |
| 9,348,078 B2 * | 5/2016 | Layton | B82Y 20/00 |
| 2002/0070350 A1 | 6/2002 | Rushbrook et al. | |
| 2004/0028371 A1 * | 2/2004 | Ota | G02B 6/08 385/146 |
| 2004/0066340 A1 * | 4/2004 | Hacker | H01P 1/2005 343/700 MS |
| 2005/0007289 A1 * | 1/2005 | Zarro | H01Q 13/02 343/786 |
| 2005/0018272 A1 * | 1/2005 | Kimura | G02B 26/02 359/295 |
| 2005/0029536 A1 | 2/2005 | Sugitatsu | |
| 2005/0041924 A1 * | 2/2005 | Bouadma | B82Y 20/00 385/43 |
| 2005/0207699 A1 | 9/2005 | Painter et al. | |
| 2006/0098918 A1 * | 5/2006 | Noda | B82Y 20/00 385/50 |
| 2007/0034250 A1 | 2/2007 | Dutta | |
| 2007/0063791 A1 * | 3/2007 | Wu | H01P 5/12 333/125 |
| 2007/0076481 A1 * | 4/2007 | Tennant | H01L 27/1465 365/185.14 |
| 2007/0201802 A1 * | 8/2007 | Mihailov | C03B 37/15 385/125 |
| 2008/0047601 A1 | 2/2008 | Nag et al. | |
| 2008/0210294 A1 | 9/2008 | Moslehi | |
| 2008/0289684 A1 | 11/2008 | Moslehi | |
| 2009/0052852 A1 * | 2/2009 | Minkovich | G02B 6/02376 385/125 |
| 2009/0086298 A1 * | 4/2009 | Okorogu | G02B 5/1876 359/15 |
| 2009/0116804 A1 | 5/2009 | Peng et al. | |
| 2009/0252456 A1 * | 10/2009 | Rasras | G02B 6/305 385/43 |
| 2009/0301549 A1 | 12/2009 | Moslehi | |
| 2010/0085573 A1 | 4/2010 | Lu et al. | |
| 2010/0108133 A1 | 5/2010 | Bhagavatula | |
| 2011/0002585 A1 * | 1/2011 | Gibson | G02B 6/2856 385/43 |
| 2011/0019186 A1 * | 1/2011 | Himmelhaus | G01N 21/648 356/317 |

(56) References Cited

U.S. PATENT DOCUMENTS

| | | | |
|---|---|---|---|
| 2011/0277361 A1* | 11/2011 | Nichol | G02B 6/0018 40/541 |
| 2012/0006382 A1 | 1/2012 | Dagli et al. | |
| 2013/0023039 A1 | 1/2013 | Zaccarin et al. | |
| 2013/0294729 A1* | 11/2013 | Layton | B82Y 20/00 385/40 |
| 2015/0228813 A1 | 8/2015 | Wertsberger | |
| 2015/0229852 A1 | 8/2015 | Wertsberger | |
| 2015/0234122 A1 | 8/2015 | Andle | |
| 2015/0247971 A1 | 9/2015 | Wertsberger | |
| 2015/0277065 A1 | 10/2015 | Wertsberger | |

FOREIGN PATENT DOCUMENTS

| | | | |
|---|---|---|---|
| JP | S 61 249004 A | | 11/1986 |
| JP | 2003224249 | | 8/2003 |
| JP | 2005316059 A | * | 11/2005 |
| JP | 2007108190 A | * | 4/2007 |
| JP | 2008 064653 A | | 3/2008 |
| WO | 199210014 | | 6/1992 |
| WO | 2004036265 | | 4/2004 |
| WO | 2005079347 | | 9/2005 |
| WO | 2010065099 | | 6/2010 |
| WO | 2010076791 | | 7/2010 |

OTHER PUBLICATIONS

Albert Polman and Harry Atwater, "Photonic Design Principles for Ultrahigh-Efficiency Photovoltaics", "Nature Materials", Jan. 3, 2013, vol. 11, Publisher: Macmillan Publishers Limited.

Ivan Avrutzki, Yang Zhao, and Vladimir Kochergin, "Surface-Ppalsmon-assisted resonant tunneling of light through a periodically corrugated thin metal film", "Optics letter", May 1, 2000, vol. 25, No. 9, Publisher: Optical Soceity of America.

Kosmas L Tsakmakidis, Allan D. Boardman & Ortwin Hess, "'Trapped Rainbow' storage of light in metamterials", "Nature", Nov. 25, 2007, pp. 397-401, vol. 450, Publisher: Nature Publishing Group.

Jang & Atwater, "Plasmonic Rainbow Trapping Structures for Light Localization and Spectrum Splitting", "Physical Review Letters", Nov. 11, 2011, vol. 107, No. 207401, Publisher: American Physical Society.

Green & Yi, "Light transmission through perforated metal thin films made by island lithography", Jul. 2, 2004, Publisher: Elsevier.

Tian Jiang, Junming Zhao and Yijun Feng, "Stopping light by an air waveguide with anisotropic metamaterial cladding", "Optics Express 170", Jan. 5, 2009, vol. 17, No. 1, Publisher: Optical Society of America.

Steve Hall, Yi Huang, Yoachun Shden and Paul Claker, "Efficient Harvesting of Solar Energy with Rectennas", "University of Liverpool,", Sep. 2011, Published in: Liverpool England.

Miskovski, Cutler, Mayer, Weiss, Willis, Sulivan & Lerner, "Nanoscale Devices for Rectification of High Frequency Radiation from the Infrared through the Visible: A New Approach", Jun. 11, 2012, Page(s) Article ID 512379, vol. 2012.

Junghyun Park, Kyoung-Youm Kim, Il-Min Lee, Hyunmin Na, Seung-Yeol Lee, and Byoungho Lee,, "Trapping light in plasmonic waveguides", "Optics Express 598", Jan. 18, 2010, vol. 18, No. 2, Publisher: Optical Society of America.

F. Przybilla, A. Degiron, C. Genet, T.W. Ebbesen, F. De Leon-Perez, J. Bravo-Abad, F. J.Garcia-Vidal, L. Martin-Moreno, "Efficiency and finite size effects in enhanced transmission through subwavelength apertures", "Optics Express 9571", Jun. 23, 2008, vol. 16, No. 13, Publisher: Optical Society of America.

PV-Magazine, "Let the Light In", Oct. 10, 2012, Publisher: www.pv-magazine.com, Published in: Berlin, Germany.

S. Mogck, C. Lehman, T. Wanski, C. Rahnfeld, and C. May, "Roll-to-roll manufacturing for small molecule flexible OLED", "EE Times", Jul. 10, 2012, Published in: Germany.

"Trapping a Rainbow: Researchers Slow Broadband Light Waves With Nanoplasmonic Structures", "www.sciencedily.com /releases/2011/03/110314152921.htm", Mar. 15, 2011, Publisher: www.sciencedily.com.

* cited by examiner

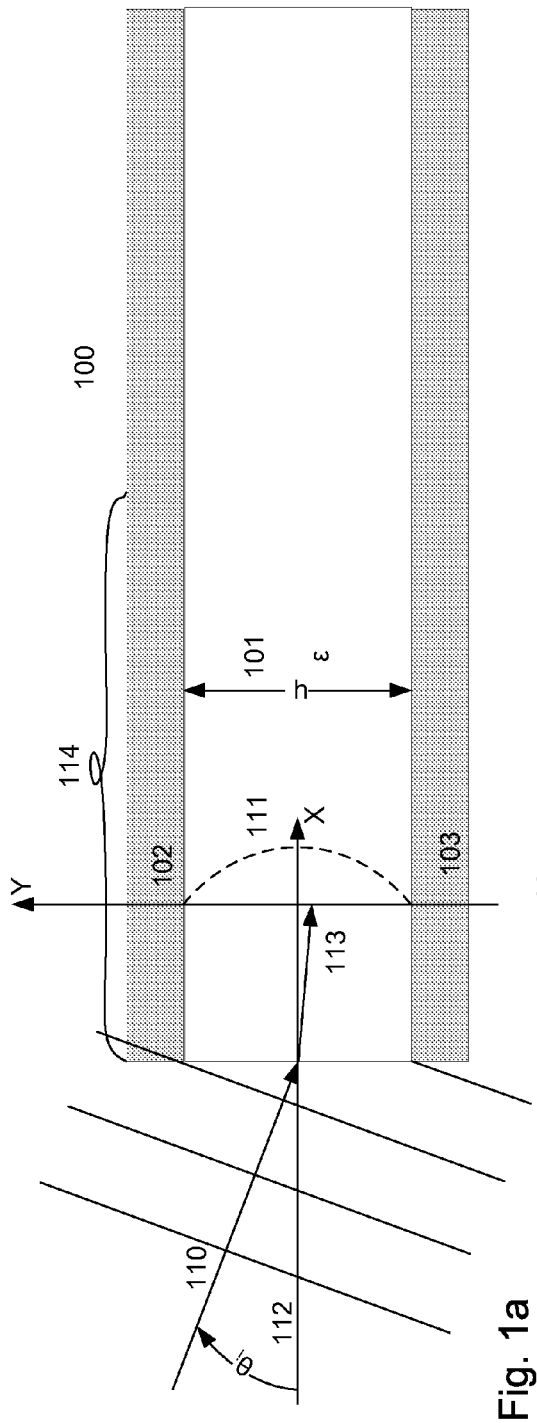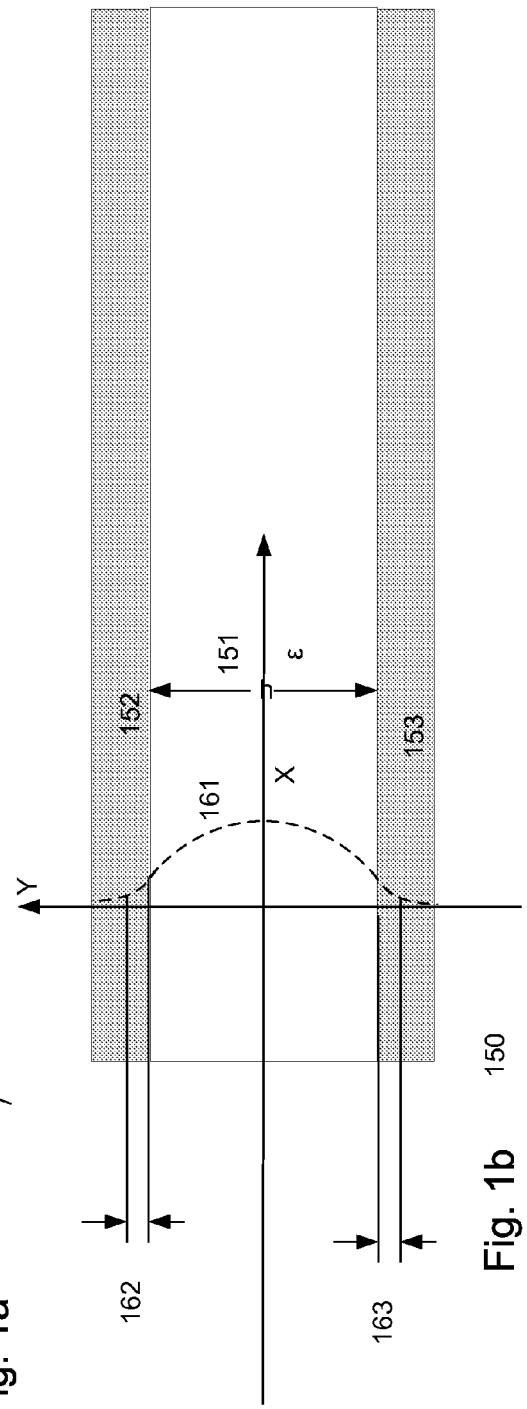

NANO-SCALE CONTINUOUS RESONANCE TRAP REFRACTOR BASED SPLITTER, COMBINER, AND REFLECTOR

RELATED APPLICATIONS

Aspects of the present invention were first disclosed in U.S. Patent Application 61/701,687 to Andle and Wertsberger, entitled "Continuous Resonant Trap Refractor, Waveguide Based Energy Detectors, Energy Conversion Cells, and Display Panels Using Same", filed 16 Sep. 2012. Further refinements of the tapered waveguide based Continuous Resonant Trap Refractor (CRTR) and to lateral waveguides with which CRTRs may cooperate, were disclosed together with various practical applications thereof in the following additional U.S. Patent Applications: 61/713,602, entitled "Image Array Sensor", filed 14 Oct. 2012; 61/718,181, entitled "Nano-Scale Continuous Resonance Trap Refractor", filed 24 Oct. 2012; 61/723,832, entitled "Pixel Structure Using Tapered Light Waveguides, Displays, Display Panels, and Devices Using Same", filed 8 Nov. 2012; 61/723,773, entitled "Optical Structure for Banknote Authentication", filed 7 Nov. 2012; Ser. No. 13/726,044 entitled "Pixel Structure Using Tapered Light Waveguides, Displays, Display Panels, and Devices Using Same", filed 22 Dec. 2012; Ser. No. 13/685,691 entitled "Pixel structure and Image Array Sensors Using Same", filed 26 Nov. 2012; Ser. No. 13/831,575 entitled "Waveguide Based Energy Converters, and energy conversion cells using same" filed Mar. 15, 2013; 61/786,357 titled "Methods of Manufacturing of Continuous Resonant Trap Structures, Supporting Structures Thereof, and Devices Using Same" filed Mar. 15, 2013, 61/801,619 titled "Tapered Waveguide for Separating and Combining Spectral Components of Electromagnetic Waves" filed Mar. 15, 2013, U.S. 61/801,431 titled "Continues Resonant Trap Refractors, lateral waveguides, and devices using same" filed Mar. 15, 2013, all to Andle and Wertsberger; and 61/724,920, entitled "Optical Structure for Banknote Authentication, and Optical Key Arrangement for Activation Signal Responsive to Special Light Characteristics", filed 10 Nov. 2012, to Wertsberger. Furthermore Patent application GB 1222557.9 filed Dec. 14, 2012 claims priority from U.S. 61/701,687. All of the above-identified patent applications are hereby incorporated herein by reference in their entireties.

FIELD OF THE INVENTION

This invention relates generally to optical nanostructures, and more specifically to a tapered core waveguide based combiner and/or splitter, and to combinations and applications thereof.

BACKGROUND OF THE INVENTION

Various areas of physics require spatially separating radiant energy into its spectral components such as by frequency and/or polarization. By way of example such fields include solar cells, image array sensors, filters, energy harvesting devices, certain types of reflectors, and the like. Similarly, various areas will benefit from mixing various spectral components into a broader type of radiant energy, combining a plurality of 'narrower' spectral components into a 'broader' radiant energy.

In its most basic form, the term 'refraction' means the change of direction of a ray of light, sound, heat, radio waves, and other forms of wave energy, as it passes from one medium to another. Generally waves of different frequencies would refract at different angles and thus refraction tends to spatially separate multispectral radiation into its spectral components by frequency. The term 'spectral component' will relate to the energy or a portion thereof in the spectral range of interest, which is characterized by its frequency, polarization, phase, flux, intensity, incidence, radiosity, energy density, radiance, or a combination thereof. Multispectral energy relates to energy having at least two spectral components.

Electromagnetic (EM) radiant energy extends over a broad frequency spectrum, however many applications deal only with portions of this spectrum. Light is one form of radiant energy which may be considered as an alternating EM radiation at very high frequency. Humans perceive different light frequencies as different colors, but there is a large amount of radiation that is not perceived by humans, generally known as UV (Ultra Violet), and IR (Infra Red), and the term light will be extended thereto. Visible light ranges generally between 760-300 nm and roughly corresponds to the peak intensity of solar radiation transmitted through the atmosphere. Infrared radiation ranges from the extreme far end of 1 mm (33 THz; millimeter radio waves) to about 760 nm. The range of millimeter waves, also known as Extra High Frequency (EHF), is specifically considered as part of the possible spectral range of different embodiments, as their behavior is sufficiently similar for the purposes of combining and separating radiant energy, so as to benefit from various aspects of the invention. As the human eye is capable of directly sensing and differentiating between light of different frequencies, it will be used oftentimes to explain the operation of different aspects of the invention for the sake of brevity and increased clarity, however the spectral range of interest to which those examples relate may be larger, and depends on the application at hand. With changes in dimensions, materials and the like, the principle described herein extend to any electromagnetic radiant energy and thus the all or portions of the spectrum ranging from the EHF to UV should be considered equivalent, unless otherwise specified or clear from the context.

It is seen therefore that radiant energy extends over a very broad radiation spectrum, and many applications would need to cover only portions of this spectrum. By way of example, for solar energy applications the spectral range of interest will likely be a spectrum containing most if not all of the solar spectrum available at the location where the solar cell is to be deployed, or the portion thereof which is economically used by the device at hand, typically of wavelength within 2-3 µm to 300 nm for example. The spectral range of interest for most display devices will fall within the visible light spectrum, even if some special application demand extending the spectral range. In some applications a specific wavelength may be desirably attenuated, such as by way of example reduction of blue light for pilot related devices. Yet, for devices directed to heat energy recovery, it is likely that only the infra-red portion of the spectral range is of interest. Similarly, the spectral range of interest may be applicable to portions of a device, such that by way of example, a device may be directed to a broad spectrum, but portions thereof may be directed to a narrower spectrum, and the spectral range of interest is thus limited to the range of interest for that portion of the device. By way of a non-limiting example a television may occupy a display portion that utilizes CRTR's as described below and additional emissions such as audio outputs. The spectral range of interest of the display may only extend to the visible range, even if the device as a whole includes the aural range as well, the aural range does not fall within the spectral range of the CRTR used in the television. It is seen therefore that the application at hand determines the spectral range of interest, and that a spectral range of interest may differ by application, an apparatus, or a portion thereof. Regarding lateral waveguides, which is described below, each waveguide may have its own spectrum of interest, which may differ from the spectral range of interest of an adjacent waveguide. Similarly, for array of CRTRs, each CRTR may have its own spectral range or ranges of interest.

Therefore, the spectral range of interest is defined herein as relating to any portion or portions of the total available spectrum of frequencies and/or polarizations, which is being utilized by the application, apparatus, and/or portion thereof, at hand, and which is desired to be filtered, channeled, detected, emitted, and/or reflected utilizing the technologies, apparatuses, and/or methods of the invention(s) described herein, or their equivalents.

At sufficiently high frequencies, radiant energy is also commonly considered as a flow of photons, which are quantized units of energy which increases with frequency. Under this quantum physics description, the energy density associated with electric and magnetic fields are probability distributions of photons. Therefore certain terms that are common to simple electromagnetic energy can be better clarified as relating to the spectrum of interest. Thus, a dielectric material in the above mentioned energy spectrum of interest relates to a material having low conductivity, and having a band-gap between a filled valence band and an empty conduction band exceeding the energy of any photon in the spectrum of interest to a specific application. In contrast, a transparent conductor is a material having a finite but meaningful conductivity due to a partially filled conduction band or partially empty valence band but having a band-gap between the valence band and conduction band exceeding the energy of any photon in the spectrum of interest. These materials act like a dielectric at high frequencies but act like a conductor at low frequencies. Transparent dielectric materials also have low optical losses such that photons efficiently transmit through such material, at least at the spectrum of interest or a significant portion thereof.

While transparent conductors may be considered as wide bandgap semiconducting materials, they are used as conductors in most applications. Dielectrics, transparent conductors, and semiconductors, as used in these specifications, refer to materials that have a dielectric constant at optical frequencies; however the distinction between a semiconductor and the remaining materials is that the bandgap of a semiconductor is not substantially larger than the photon energy. As a general and non-limiting guideline, table 1 describes several characteristics of the different conductive, insulating, and semi-conductive materials.

TABLE 1

| Material | Metal | Transparent conductor | Semiconductor | Dielectric |
|---|---|---|---|---|
| Bandgap | → 0 | >>photon | ≤photon | >>photon |
| DC Conductivity | high | good | Varies | → 0 |
| Optical Property | reflective | transparent low loss | absorptive lossy | transparent low loss |
| Dielectric constant | complex | | | |

Waveguides are a known structure for trapping and guiding electromagnetic energy along a predetermined path. An efficient waveguide may be formed by locating a layer of dielectric or semiconducting material between cladding layers on opposite sides thereof, or surrounding it. The cladding may comprise dielectric material or conductors, commonly metal. Waveguides have a cutoff frequency, which is dictated by the wave propagation velocity in the waveguide materials, and the waveguide width. As the frequency of the energy propagating in the waveguide approaches the cutoff frequency Fc, the energy propagation speed along the waveguide is slowed down. The energy propagation of a wave along a waveguide may be considered as having an angle relative to cladding. This angle is determined by the relationship between the wavelength of the wave and the waveguide width in the dimension in which the wave is being guided. If the width of the waveguide equals one half of the wave wavelength, the wave reaches resonance, and the energy propagation along the waveguide propagation axis stops.

In these specifications, the term cladding penetration state relates to a condition where energy confined by the tapered core waveguide leaves the waveguide via the cladding. Generally each waveguide has some negligible penetration of energy into the cladding, however cladding penetration state occurs when a significant amount of energy is transported through the cladding. Cladding penetration state is generally frequency related, and energy of one frequency may reach cladding penetration state at a different set of conditions than the cladding penetration state of another frequency. By way of non-limiting example, if 66% of the energy of frequencies between F1 and F2 will exit a hypothetical waveguide via the cladding at a distance between 1 um to 2 um from the waveguide aperture, the cladding penetration state for F1-F2 would exist between 1-2 um from the aperture. Other frequencies may or may not overlap such range partially or completely. Notably the number 66% has been arbitrarily selected by way of example only, and may be modified as an engineering choice according to the application at hand.

In these specifications, cladding penetration state is used primarily to define a location or a region where cladding penetration would occur, rather than necessarily the actual occurrence of cladding penetration. As discussed below, energy may be coupled into the waveguide core via the cladding at the region about which cladding penetration state would occur, as well as be outputted therefrom.

Stationary resonance condition is a condition in a waveguide where the local cutoff frequency of the waveguide equals the frequency of a wave guided by the waveguide, such that the guided wave reflects repeatedly between opposing surfaces of the guide, however the corresponding component of energy velocity along the waveguide propagation axis is zero. As the wave frequency approaches the local cutoff frequency of the waveguide, a sharp decrease in the wave propagation (group) velocity is noticed at the immediate vicinity of the cutoff dimension, as may be seen by way of example in the lower graph of FIG. 3. While complete stationary resonance condition is seldom if ever achievable, for the purpose of these specifications a stationary resonance (SRC) condition will be considered a situation where the guided wave is sufficiently close to the complete stationary resonance condition to significantly lower than the speed of light in the bulk material of the waveguide. Stated differently, when a wave falls within the zone of the sharp decrease in velocity it is considered to be in SRC.

With proper selection of cladding material and dimensions, energy will reach a cladding penetration state and depart the waveguide through the cladding at this stationary resonant condition. This mechanism is related to by the acronym CPS-SRC. CPS-SRC often occurs with reflective cladding, comprising thin metallic cladding. Notably a metallic cladding of lower thickness than the penetration depth to which the cladding is locally exposed would allow energy to pass therethrough and such cladding may be utilized. Furthermore, when certain metals are disposed at low thicknesses they tend to "ball-up" and form small "islands". Such "balled-up" metal, and/or intentionally perforated metal cladding may also form a discontinuous metal film cladding in a reflective CRTR waveguide.

Total internal reflection (TIR) is a phenomenon which occurs when a guided wave hits the boundary between the core and the cladding below a certain angle relative to the local propagation axis of the waveguide. The angle is known as the critical angel of total Internal Reflection. When a guided wave reaches or exceeds the critical angle it departs the waveguide via the cladding under normal refraction. Slightly below this critical angle the internal reflection by a finite cladding becomes incomplete in a process known as Frustrated Total internal Reflection (FTIR). This condition occurs mostly with dielectric cladding, but metallic claddings with small perforations or with thicknesses at or near the tunnel distance also have angle dependent reflection coefficients, resulting in a situation analogous to FTIR. Cladding penetration condition reached by a wave exceeding the critical angle of total internal reflection is referred to hereinafter as CPS-FTIR. Both CPS-FTIR and CPS-SRC are characterized by energy traversing the cladding, thus CPS, or 'cladding penetration state' will be used interchangeably to denote CPS occurring through any mechanism.

Collectively, objects, materials, and structures, which inter-convert electromagnetic and electrical energy are known by various names which denote equivalent structures, such as converters, transducers, absorbers, detectors, sensors, and the like. To increase clarity, such structures will be referred to hereinunder as 'transducers'. By way of non-limiting examples, the term "transducer" relates to light sources, light emitters, light modulators, light sensors, photovoltaic materials including organic and inorganic transducers, quantum dots, CCD and CMOS structures, LEDs, OLEDs, LCDs, laser sources, receiving and/or transmitting antennas and/or rectennas, phototransistors photodiodes, diodes, electroluminescent devices, fluorescent devices, gas discharge devices, electrochemical transducers, and the like. Certain transducers may be configured to convert energy forms bidirectioanlly, such as a single transducer which may operate as a converter from electrical energy to radiant energy, and vice versa. Alternatively transducers may be built to convert only from one energy form to another. Transducers for conversion of radiant energy to electricity or electrical signals (hereinafter "LE"), or conversion of electrical signals into radiant energy such as light (hereinafter "EL") are known.

A transducer of special construction is the RL type transducer, which is a reflective transducer. Reflective transducers controllably reflect radiant energy. Such transducers may comprise micro-mirrors, light gates, Liquid Crystals (LCD), and the like, positioned to selectively block the passage of radiant energy, and reflect it into a predetermined path, which is often but not always, the general direction the energy arrived from. Certain arrangements of semiconductor and magnetic arrangements may act as RL transducers by virtue of imparting changes in propagation direction of the radiant energy, and thus magnetic forces or electrical fields may bend a radiant frequency beam to the point that in effect, it may be considered as reflected. RL transducers may be fixed, or may be used to modulate the energy direction over time. Passive transducers such as LCD and micromirrors fall into the RL class of transducers when used to reflect incoming energy, but when used in conjunction with at least one light source, such transducers may also be considered as LE type transducers.

Radiant energy transducers, and especially LE transducers, typically employ normal incidence of radiant electromagnetic energy onto a conversion structure. Normal incidence has the limitation of a finite probability of detecting energy before it is transmitted through the conversion layer. Energy transmitted through the conversion layer is, at best, lost and, at worst, converted to heat in the supporting substrate. Several attempts has been made to provide transducers that use 'side illumination' in which the light is inserted from the side of the junction. Such examples include, inter-alia, in U.S. Pat. No. 3,422,527 to Gault, U.S. Pat. No. 3,433,677 to Robinson, and U.S. Pat. No. 4,332,973 to Sater.

Prisms and other refractive devices can be used to improve incidence angles, and to direct different frequencies of radiant energy to different regions of a transducer, where each region is optimized for a target frequency. U.S. Pat. No. 7,888,589 to Mastromattteo and U.S. Pat. No. 8,188,366 to Hecht, disclose examples of such devices. Different arrangements of concentrators are also known, which are operative to concentrate energy to transducers. U.S. Pat. No. 5,578,140 to Yogev et al. as well as Hecht provide examples to such arrangements. Those methods require significantly increased device area, and reduce the total energy per unit area (and per unit manufacturing cost) in exchange for increased efficiency.

Vertical optical waveguides are known in the prior art. U.S. Pat. No. 4,251,679 to Zwan depicts a plurality of transducing cavities having an inwardly inclined wall to receive impinging radiation. Two potential barrier strips each having different conduction electron densities; each potential barrier strip is connected to a conductor having a preselected conduction electron density whereby radiation impinging on a cavity will induce current flow which will be rectified across the potential barriers. U.S. Pat. No. 3,310,439 to Seney relates to embedding spaced dimensioned crystals into p-n semiconductor layers of a solar cell device. The crystals function as waveguides into the photovoltaic layer.

Tapered waveguide directed at trapping radiant energy, as opposed to emitting energy via the cladding, have been disclosed by Min Seok Jang and Harry Atwater in "Plasmionic Rainbow Trapping Structures for Light localization and Spectrum Splitting" (Physical Review Letters, RPL 107, 207401 (2011), 11 Nov. 2011, American Physical Society©). The article "Visible-band dispersion by a tapered air-core Bragg waveguide", (B. Drobot, A. Melnyk, M. Zhang, T. W. Allen, and R. G. DeCorby, 8 Oct. 2012/Vol. 20, No. 21/OPTICS EXPRESS 23906, ©2012 Optical Society of America_ "Visible-band dispersion by a tapered air-core Bragg waveguide" B. Drobot, A. Melnyk, M. Zhang, T. W. Allen, and R. G. DeCorby, 8 Oct. 2012/Vol. 20, No. 21/OPTICS EXPRESS 23906, ©2012 Optical Society of America) describes out-coupling of visible band light from a tapered hollow waveguide with TiO2/SiO2 Bragg mirrors. The mirrors exhibit an omnidirectional band for TE-polarized modes in the ~490 to 570 nm wavelength range, resulting in near-vertical radiation at mode cutoff positions. Since cutoff is wavelength-dependent, white light is spatially dispersed by the taper. These tapers can potentially form the basis for compact micro-spectrometers in lab-on-a-chip and optofluidic micro-systems. Notably, Bragg mirrors are very frequency selective, complex to manufacture, and require at least a width higher than ¾ wavelength to provide any breadth of spectrum. In addition to the very narrow band, the Bragg mirrors dictate a narrow bandwidth with specific polarization, while providing however a fine spectral resolution.

However the known art does not provide a multi purpose small scale splitter/combiner/reflector of radiant energy. There is therefore a clear and heretofore unmet need for a small-scale spectral manipulation structure that would do one or more of: split multispectral electromagnetic radiation to obtain spectral component(s) contained in the multispectral radiation; mix spectral components to obtain multispectral electromagnetic radiation; redirect incoming electromagnetic energy so as to be diverted at some nonzero angle from its initial propagation direction; separate electromagnetic components by polarization; combine electromagnetic components of different polarizations, controllably reflect certain spectral components, and any combination of the above.

SUMMARY OF THE INVENTION

It is therefore an object of the present invention to provide a tapered waveguide for separating mixed electromagnetic waves into spectral component(s) and/or for combining spectral components into mixed multispectral electromagnetic energy.

It is a further object of the present invention to provide a refractor which is easily manufactured, and which refracts energy into spatially separated component frequencies and/ or polarizations. It is another object of the present invention to provide a refractor that will steer the incoming energy from the incidence direction or acceptance cone and radiate the spatially separated energy at various locations and/or angles from the incidence direction of the waveguide.

It is a further object of the invention to provide a compact optical mixer/combiner that will combine radiant energy components from a plurality of sources at various locations and/or angles from the normal incidence direction of the waveguide, and output the combined radiation from a single aperture.

It is yet a further object of the invention to provide a hybrid structure in which energy incident at the aperture in one portion of the spectrum is collected while energy generated about the tapered waveguide, in another portion of the spectrum is combined and radiated out of the structure.

It is yet another object of the invention to provide selective absorption and/or reflection of portions of an incoming spectrum of radiant energy, so as to provide passive reflection of lights as required for a passive display device. Alternatively, the structure may absorb energy of one or more portions of the spectrum, reducing reflection of such energy.

In very basic terms, the present invention relates to a structure called Continuous Resonant Trap Refractor (CRTR) which is based on a waveguide having a tapered core, the core having a wide base face forming an aperture, and a narrower tip. The core is surrounded at least partially by a cladding. The CRTR may be operated in splitter mode, in combiner mode, and/or in reflective mode. In splitter mode the radiant energy wave travels along the depth direction extending between the aperture and the tip, and in mixer, or combiner mode, the wave travels towards the aperture. The depth increases from the aperture towards the tip, such that larger depth implies greater distance from the aperture. Due to the core taper, when multi-frequency radiant energy is admitted through the CRTR aperture, lower frequency waves will reach cladding penetration state before higher frequency waves, and will penetrate the cladding and exit the waveguide at a shallower depth than at least one higher frequency wave. Thus, the CRTR will provide spatially separated spectrum along its cladding. Conversely, when operated in combiner mode, a wave coupled to the core via the cladding at coupling depth, will travel from the emission depth towards the aperture, and different frequencies coupled through the cladding will be mixed and emitted through the aperture. Coupling radiant energy into the CRTR core from the cladding, will be related as 'injecting' or 'inserting' energy into the CRTR.

Certain non-symmetrical or multi-faceted symmetrical tapered core forms will cause separation of the aperture-admitted radiant energy to be polarization sensitive. Thus, by way of example, a square pyramid or frustum CRTR core will separate incoming radiant energy into its component polarizations as well as by its frequency. This behavior will be reversed when the CRTR operates in mixer/combiner mode, such that energy emitted from the aperture will reflect the polarity created by separate sources, and injected into the CRTR at different faces. By way of none-limiting example, if light source A injects modulated energy into one face of a square cross-section pyramidal core, and light source B injects differently modulated energy into a perpendicular face of core, the light emitted by the aperture at the base of the pyramid will have one spectral component at a first polarization reflecting the modulation of source A, and a second spectral component at 90° to the first spectral component, representing the modulation of source B. Thus the two sources A and B form an angle therebetween, the angle is said to be parallel to a width plane when an angle exists between the two sources when their location is projected to at least one width plane, regardless of their actual depth.

In a first aspect of the invention, there is provided a spectral splitter for spatially separating multispectral radiant energy into at least two spectral component thereof, the splitter comprising a tapered waveguide core having a first end and a second end, the first end defining an aperture, the core having a depth direction extending between the first end and the second end, wherein the depth magnitude increases with distance from the first end towards the second end. The core also has a width dimension in at least one direction substantially transverse to the depth direction, the core width monotonically decreasing in magnitude in at least one direction, as a function of the depth such that the width magnitude at the aperture is higher than the width magnitude at the second end. A cladding is disposed at least partially around the core. The first end of the core, i.e. the aperture, is dimensioned to allow passage of radiant energy comprising at least a first and a second spectral components each having a frequency associated therewith, wherein the first spectral component has a lower frequency than the second spectral component. The varying width of the core resulting in the first and the second spectral components each reaching a state (CPS) at which they will penetrate the cladding and be emitted from the waveguide via the cladding at a respective first and second depth, wherein the first depth is less than the second depth.

The skilled in the art will recognize that the tapered waveguide core and the cladding disposed at least partially thereabout form a waveguide, and due to the core being tapered, spectral components having lower frequency will reach a CPS prior to spectral components having higher frequency. The core or the cladding may comprise fluid.

The width of a two dimensional CRTR is transverse to the depth direction, while for a three dimensional CRTR, at any depth the CRTR has a plurality of width transverse to the depth direction. The different widths for a single depth form a width plane, which is transverse to the depth direction, and the term 'in at least one direction' as related to width, relate to directions on the width plane or parallel thereto. Any given depth correspond with its width plane, and thus there are infinite number of parallel width planes.

In certain embodiments the tapered core may exhibit a generally round cross-section on its width plane, however a perfect circle is not required. In some embodiments the tapered core cross-section may be symmetrical and in others asymmetrical. In certain embodiments the cross section is square, hexagonal, octagonal, or other symmetrical multifaceted shape. In some embodiments the core may form an elongated wedge, i.e. forming a plurality of rectangular cross-sections on the respective width planes.

In a similar fashion when operated in splitter mode, and with multifaceted core, the first and second spectral components may differ from each other by having different polarization, rather than, or in combination with, different frequency. Therefore, in a second aspect of the invention, there is provided a spectral splitter for spatially separating multi-polarization radiant energy into at least two spectral component thereof, the splitter comprising a tapered waveguide core having a first end and a second end, the first end defining an aperture, the core having a depth direction extending between the first end and the second end, wherein the depth magnitude increases with distance from the first end towards the second end. The core also has a plurality of stacked cross-sections in a respective plurality of width planes, the cross-sections having at least one width dimension decreasing in magnitude as a function of the depth such that the width magnitude at the aperture is higher than the width magnitude at the second end, at least one of the cross-sections being either a multifaceted symmetrical shape, or an asymmetrical shape. A cladding is disposed at least partially around the core. The first end of the core, i.e. the aperture, is dimensioned to allow passage of radiant energy comprising at least a first and a second spectral components each having a different polarization associated therewith, The shape of the cross-section of the core resulting in the first and the second spectral components each reaching a state at which they will penetrate the cladding and exit the waveguide via the cladding, at a first and second direction, respectively. At least in cores having symmetrical multifaceted cross-section, if the spectral components have differing frequencies as well as different polarization, they will reach their CPS at different depth as well as be emitted at a different direction.

Optionally, the splitter also comprises at least a first and a second energy transducers for converting radiant energy to electrical energy (LE) and/or electrical energy to radiant energy (EL), wherein the first transducer is disposed in a path to receive the first spectral component, and the second transducer is disposed in a path to receive the second spectral component, after the respective spectral components exists the waveguide. The splitter or the combiner may be embedded in a stratum. A stratum is a surrounding structure about CRTR's In a third aspect of the invention there is provided a spectral combiner comprising a tapered waveguide core having a first end and a second end, the first end defining an aperture, the core having a depth direction extending between the first end and the second end, wherein the depth magnitude increases with distance from the first end towards the second end, the core having a width dimension in at least one direction transverse to the depth direction, and the core width decreasing in magnitude in at least one direction, as a function of the depth such that the width magnitude at the aperture is higher than the width magnitude at the second end. A cladding is disposed at least partially around the core. At least a first and a second radiant energy sources are disposed about the cladding such that when energized they couple energy emitted therefrom to the core via the cladding. The energy emitted from the energy sources is coupled into the core at or about the cladding penetration depth of at least one wave in the energy emitted by the energy source. Stated differently the energy will couple to the core at a depth where the core width is at, or adjacent to, an integer multiple of half of the respective wavelength of the source. Preferably the integer multiple is one, and the core width is slightly larger than half the wavelength to provide efficient coupling of the energy into the core.

The term "about the cladding" or equivalently about the CRTR or its core, should be construed to mean being coupled to via energy path, which implies that the transducer is disposed about the cladding not only by being physically adjacent to the cladding, but also when an energy path such as beam propagation, waveguide, and the like, exists between the location where energy is transferred in or out of the cladding, and the transducer. Similarly, the disposition about the cladding is set by the location at which the energy exists or enters the cladding. Thus, by way of example if the transducer is coupled to the cladding via a waveguide such that the energy couples at depth A of the CRTR, the transducer is considered to be disposed at depth A regardless of its physical location relative to the RCTR.

The depth at which the wave injected via the cladding would couple into the tapered core presents a challenge to define. At the exact depth of CPS the wave may not couple properly into the core, thus expressions such 'slightly above CPS depth', 'adjacent to' 'about', and others, as referred to the coupling of light into the tapered core in combiner/mixer mode should thus be construed as the depth at which energy injected into tapered core via the cladding would best couple to the core to be emitted via the aperture. The parameters of selecting the best coupling fall within considerations such as manufacture limitations, required precision, cost, engineering choices, and the like. Such depth would generally be referred to as "coupling depth"

The skilled in the art may recognize a similarity between the waveguide formed by the tapered core and the cladding of the different aspects of the invention described thus far. Furthermore, the aspect of the invention which required a specific symmetrical multifaceted core cross-section in at least one depth, may act as a core for other aspects of the invention. Indeed the tapered core waveguide disclosed may be operated in a splitter mode and/or combiner mode, depending on the direction of energy propagation. In splitter mode energy admitted into the waveguide via the aperture is split to its spectral components either by frequency, polarization, or a combination thereof, and the spectral components are emitted via the cladding. When operated in a combiner mode, spectral components of the energy are admitted into the waveguide via the cladding and the spectral components are combined and are emitted via the aperture. Notably, the tapered core waveguide may be operated as combiner and a splitter simultaneously, for different spectral components. As certain structural aspects are common to the two aspects on the invention, many of the following additional features may be considered applicable to different aspects, separately or in combination. For the purpose of this disclosure, negligible material and interface loses in the CRTR are ignored.

In combiner embodiments where the energy sources are of different frequency, they are arranged to couple to the core at different width planes, and optionally energy sources are arranged to inject energy which will be emitted via the aperture at separately controlled polarization. The energy sources would be arranged to inject the energy at different axes of the cross-section of the core, thus forming an angle therebetween on a plane parallel to a width plane. Clearly, combinations of energy sources to produce combinations of multi-frequency and multi-polarization are explicitly considered. In order to derive multiple polarizations, a multifaceted core is preferred, wherein the first and the second energy sources are disposed to couple the energy emitted therefrom into different facets of the multifaceted core.

CRTRs may also be operated in reflective modes, where a RL transducer is disposed such that a spectral component of radiant energy admitted into the tapered core is emitted via the cladding, and impinge upon the RL type transducer. The RL transducer controllably reflects at least a portion of the energy impinging thereupon via the cladding back into the core, where it is emitted via the aperture.

In splitter mode, asymmetrical core cross-section or multifaceted symmetrical cross-section would also provide a splitter that will split the energy admitted into the core via the aperture to spectral components based on their polarization. Splitting the aperture-admitted energy in combinations of frequency and polarization are yet another feature of the invention.

To increase brevity, the structures described above, whether operated in combiner mode, splitter mode, reflective mode or any combination thereof, will be related as CRTR. CRTRs are described more completely below.

Most commonly, CRTRs are disposed within a surrounding structure which will be referred to in these specifications as "stratum". The outer cladding of the CRTR may be disposed, at least in part, within a stratum. The stratum may be disposed on top of a substrate if one is used. Additional materials may be disposed on top of the stratum, such as anti-reflective layers, protective layers, collimation layers, lenses, and the like. Stratums may be roughly divided into slab stratum and layered stratum, and the selection of the type of stratum is a matter of technical choice. Certain layered stratums are formed as a plurality of superposed waveguides, termed stacked waveguides, or equivalently as lateral waveguides hereinafter. The waveguides in such a stacked waveguide system may be coupled with one or more CRTR tapered waveguides such that spectral component(s) separated by a CRTR are directed toward one or more of the stacked waveguides. In other embodiments the stratum comprises a slab of material that is transmissive of the radiant energy spectral range of interest.

In some embodiments the tapered core is a symmetrical multifaceted core, and a first transducer is disposed about a first face of the multifaceted core, and a second transducer is disposed about a second face of the multifaceted core. In splitter modes the energy transducers convert radiant energy to electrical energy (LE transducers) and the structure provides detection of spectral components of two separate polarizations. In combiner modes, the transducers convert electrical energy to radiant energy (EL transducers), or modulate radiant energy in accordance with an electrical signal (RL transducers), and the structure provides a combiner which can emit radiant energy through the aperture where the energy has two separately controlled polarization spectral components, each reflective of the respective signal fed to the transducers.

The cladding may comprise metal having a thickness in the order of, or lower than, the skin penetration depth for at least one spectral component, at or about the cladding penetration depth of the spectral component. In some embodiments the cladding comprises a continuous or a discontinuous metal film, and some embodiments the cladding comprises a material having a lower refractive index than the refractive index of the core. Such cladding will often be dielectric.

Generally, and especially in metal cladding devices, the local thickness of the cladding does not exceed the local skin penetration depth. In some embodiments the local thickness of the cladding does not exceed a quarter of the wavelength associated with the first spectral component. In some embodiments the local thickness of the cladding as a whole does not exceed a quarter of the local wavelength. Claddings of more than half the local wavelength are workable. Cladding of higher thickness, such as cladding of more than three quarters of the local wavelength are generally undesirable, unless at the tip of the waveguide where their influence is negligible. However in the case of straight pit walls, paralleling generally the depth direction, thicker cladding may be placed between the pit and the core, to ease manufacturing.

In some embodiments the cladding thickness is reduced as a function of depth, such that the cladding becomes thinner with increased depth. However in some embodiments the cladding becomes thicker as a function of depth. Oftentimes in these embodiments the core and cladding are disposed in a pit having a straight wall, and the core is inserted into the cladding. In pit based CRTR as described above, the cladding may be thicker than a whole wavelength at the tip end of the tapered core.

In certain embodiments the splitter further comprises a plurality of controllable light modulators, disposed about the cladding.

While the CRTR is useful as a standalone invention in certain applications, it is oftentimes more useful when a plurality of such CRTR structures operates in combination. To that end there is provided an array comprising a plurality of spectral splitters. In some embodiments, such array further comprises one or more lenses disposed over the apertures of the plurality of splitters. In some embodiments the apertures of the plurality of splitters lie substantially on a focal plane of the lens. Optionally, the lens comprises a mating surface for mating with the plurality of apertures, the mating surface having a plurality of protrusions extending therefrom, at least one of the protrusions dimensioned to act as the cores of a corresponding spectral splitter. In such embodiments, a plurality of pits is formed in a stratum, and the protrusions on the lens are aligned with matching pits, and the stratum and the lens are mated. Cladding may be deposited in the pits and displaced by the protrusions, may be deposited on the protrusions prior to mating, or may be flowed into the pits after the mating. The cladding may be a fluid, and may or may not be solidified after the stratum and the lens are mated. Each of the members of the array may then become a pixel in an image sensor, or a portion of an advanced, concentrated solar cell, phased array antenna, and the like.

Similarly, CRTRs operated as combiners may be operated as an array forming a display in the visible light spectrum, or be operated as an antenna which may act as a phased array antenna. As described, a single CRTR may operate in a combiner mode and/or in splitter mode, and therefore a combination of the functions described above may be utilized. By way of non-limiting example, a single transmitting/receiving antenna may be formed of an array of cooperating CRTRs. Such array may act to steer a beam in any of desired directions by feeding the transducers of the CRTRs with signals having a phase difference therebetween.

Phased array antennas operate on principles of interference between the radiant energy emitted from various antenna elements. Such interference may be created by manipulating the phase and/or amplitude of the signal emitted form a plurality of antenna elements. The steering of the antenna offers the ability to radiate extremely narrow beam which in certain embodiments may be utilized for writing or marking very small features such as features used in the photolithography. The small size of the individual CRTRs and their ability to provide high intensity signals make the CRTR based phased array a powerful tool. By way of example, an array of CRTRs dimensioned to operate at the UV range would be very small at just over half of the longest emitted wavelength. In this type of lasers only a single transducer may be used per CRTR, however a plurality of transducers may provide better resolution. UV lasers coupled to separate CRTRs or to one CRTR, may be individually controlled and fed different phase and/or amplitude signals, and their interference would allow for a beam to form features that are far smaller than the wavelength. Such arrays may also be used for writing of certain images, for ablating material in a programmatic manner, as well as form scanning beams such as radar and the like.

The terms 'symmetrically multifaceted core' or 'multifaceted symmetrical core' imply that the core is shaped as three dimensional multifaceted body having at least one symmetrical polygonal cross-section. The consecutive cross-sections of such body may differ in shape, but generally are smaller in at least one dimension, the further the cross-section is along the depth axis. In some embodiments, the base is of different shape and slowly vary towards the symmetrical polygon. However relating to a radiant energy having at least a first spectral component having a first polarization and a second spectral component having a different polarization, a symmetrical multifaceted core may be recognized by having at least one cross-section at the width plane, where in splitter mode, the first spectral component will exit the cladding in different direction than the second spectral component. Commonly, the multifaceted symmetrical core is formed by a polyhedron having a symmetrical polygonal base and converging triangular or trapezoidal sides, where the base is substantially transverse to the depth direction. Notably multi-faceted core symmetry and certain asymmetrical core forms may operate to separate or combine spectral components of different polarization. For the purposes of these specifications, such asymmetrical core forms is considered as multifaceted symmetrical form, and the specifications and claims extend thereto.

A CRTR is considered to operate in hybrid mode when energy is both admitted and emitted via the aperture. In certain embodiment this mode involves energy being admitted via the aperture and at least portions thereof being emitted via the cladding, while other energy is being injected via the cladding and emitted via the aperture. In other embodiments a portion of the energy admitted via the aperture is selectively reflected back therethrough, such as when utilizing a RL type transducer. A hybrid transmitter may be considered as any one of a) an emitting CRTR operating as a mixer, b) a sensing or receiving CRTR acting in splitter mode, and/or c) a reflective CRTR operating with at least one RL type transducer for controllably reflecting at least part of energy admitted via the aperture. Thus, by way of example, a call for a splitter CRTR in these specifications may be fulfilled by a hybrid CRTR capable of acting as a splitter.

CRTRs may also operate in reflective mode, by providing light gates which will reflect radiant energy back into the CRTR tapered core. A light gate disposed at the depth where radiant energy is emitted out of the cladding, will cause the emitted energy to be reflected back into the cladding, and thence emitted via the aperture. An array of CRTRs in conjunction with RL transducers which act as light-gates will have variable reflectivity such that at least a portion of the light incident on the array at the associated frequency will be reflected, in accordance with the setting of the light gate reflectors. The term light gate should be construed to a device able of controlling light passage or block, absorption, reflectance, and the like, across a spectral range of interest, which may extend beyond the visible range. The spectral range of interest is dictated by the application at hand. The broad band capabilities of the CRTR allows modulation of its reflectance over a broad band of frequencies, extending the ability for reflectance into the UV, IR, and even the mm wave spectrum. Reflective mode may also operate in polarization sensitive mode as explained above for EL and LE transducers in polarization sensitive mode.

Therefore, in certain embodiments there is provided a hybrid spectral splitter and combiner the hybrid comprising: a tapered waveguide core having a first end and a second end, the first end defining an aperture, the core having a depth direction extending between the first end and the second end, wherein the depth magnitude increases with distance from the first end towards the second end; the core having a width dimension in at least one direction transverse to the depth direction; the core width decreasing in magnitude in at least one direction, as a function of the depth such that the width magnitude at the aperture is higher than the width magnitude at the second end. A cladding disposed at least partially around the core, wherein the first end of the core is dimensioned to allow passage of radiant energy comprising at least an admitted spectral component having a frequency associated therewith, wherein the varying width of the core resulting in the admitted spectral components reaching a CPS—a state at which they will penetrate the cladding and exit the waveguide via the cladding—at a at a frequency dependent depth. At least one energy transducer is disposed about the cladding to receive the spectral component. Furthermore, the hybrid comprises at least a one radiant energy source disposed about the cladding to couple energy emitted therefrom to the core via the cladding, wherein the energy emitted from the energy source is coupled into the core about the coupling depth. Optionally, the transducers and the light sources are integrated in a single component. Further optionally the hybrid and/or the light sources and/or the transducers may be embedded in a stratum. Importantly, embedded in the stratum does not necessitate that the whole CRTR will be completely enveloped by the stratum, but merely that the stratum and the CRTRs are in communication for transferring energy therebetween, or a portion of the CRTR is disposed in contact with the stratum.

An additional aspect of the invention provides a reflective microstructure comprising a tapered waveguide core having a first end and a second end, the first end defining an aperture, the core having a depth direction extending between the first end and the second end, wherein the depth magnitude increases with distance from the first end towards the second end, the core having a width dimension in at least one direction transverse to the depth direction, the core width decreasing in magnitude in at least one direction, as a function of the depth such that the width magnitude at the aperture is higher than the width magnitude at the second end. A cladding disposed at least partially around the core, wherein the first end of the core is dimensioned to allow passage of radiant energy comprising at least one admitted spectral component having a frequency associated therewith. The varying width of the core results in the spectral component reaching a cladding penetration state at which it will penetrate the cladding and exit the waveguide via the cladding, at a frequency dependent depth. An RL type transducer is disposed about the cladding, in a path to controllably reflect the admitted spectral components which was emitted via the cladding, and reflect at least a portion the radiant energy of the spectral component via the cladding into the core, where it will be emitted through the aperture.

CRTRs may be two dimensional or three dimensional, and the claims relate to both types.

Further combinations of elements of different aspects of the invention would be clear in light of the teachings of these specifications.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples.

FIGS. 1a and 1b respectively depict two-dimensional simplified waveguides.

FIGS. 8a-8e provide different examples of polarization sensitive CRTRs

Figure 9:
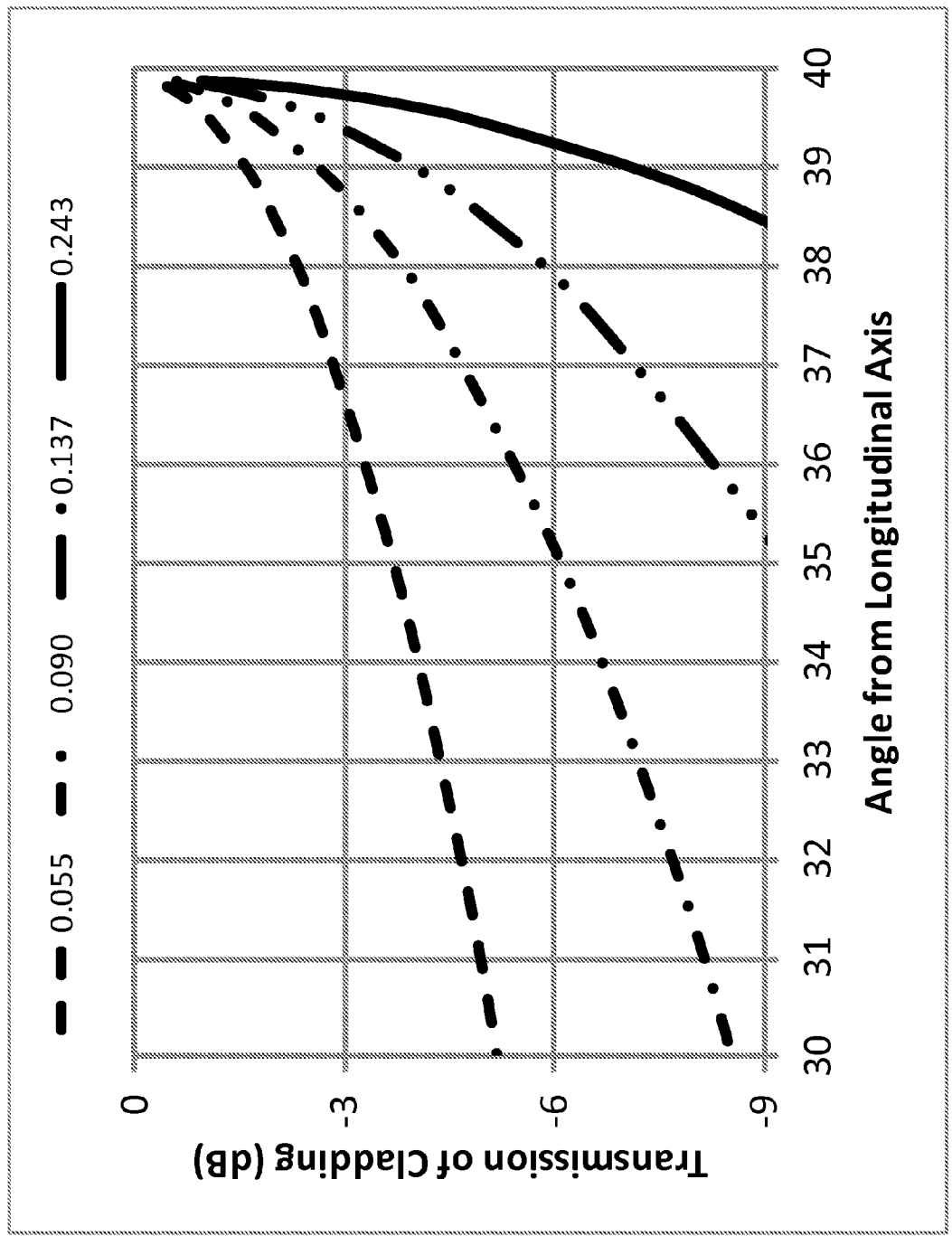
Figure 10:
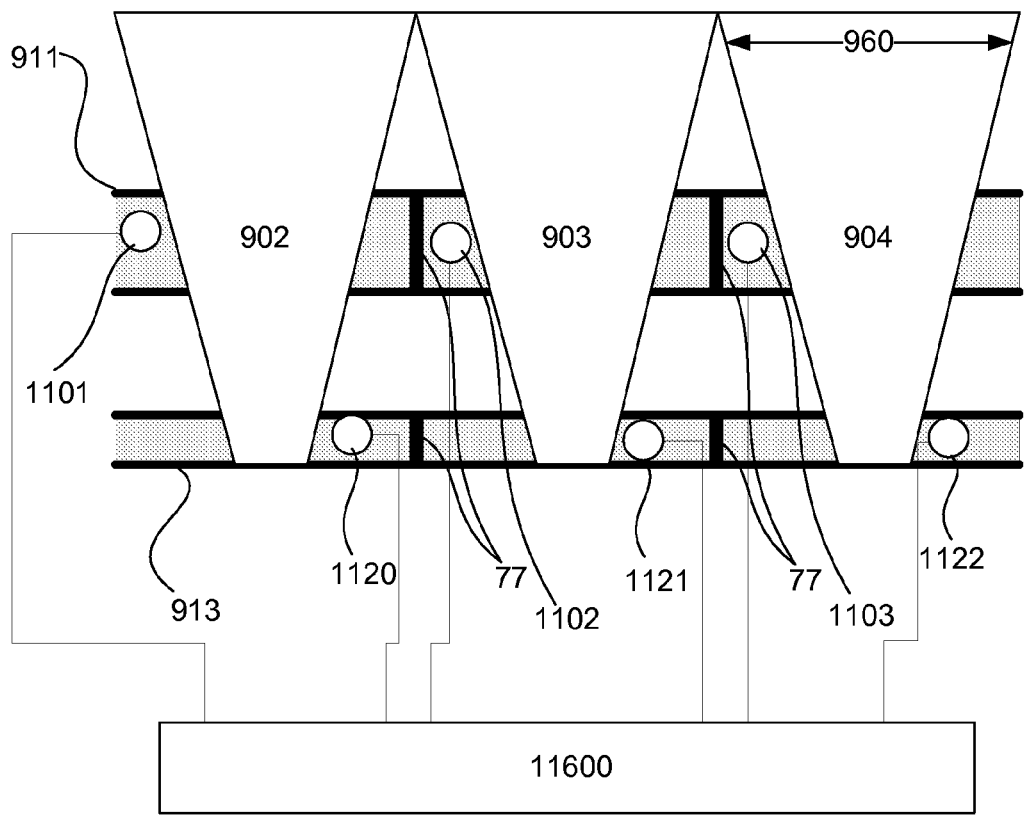

FIG. 9 depicts simplified graph showing angle-dependent transmissivity through a dielectric cladding FIG. 10 depicts a portion of a CRTR based array antenna.

Figure 10A:
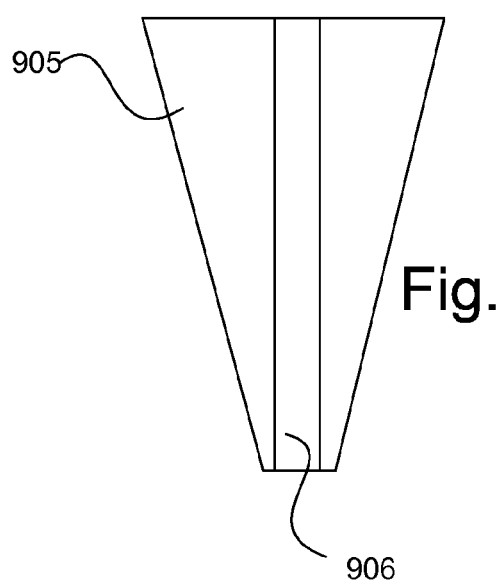

FIG. 10A depicts a cross-section of a CRTR tapered core, having a center void or pole.

FIGS. 11A-D depict an optional method of manufacturing.

Figure 12:
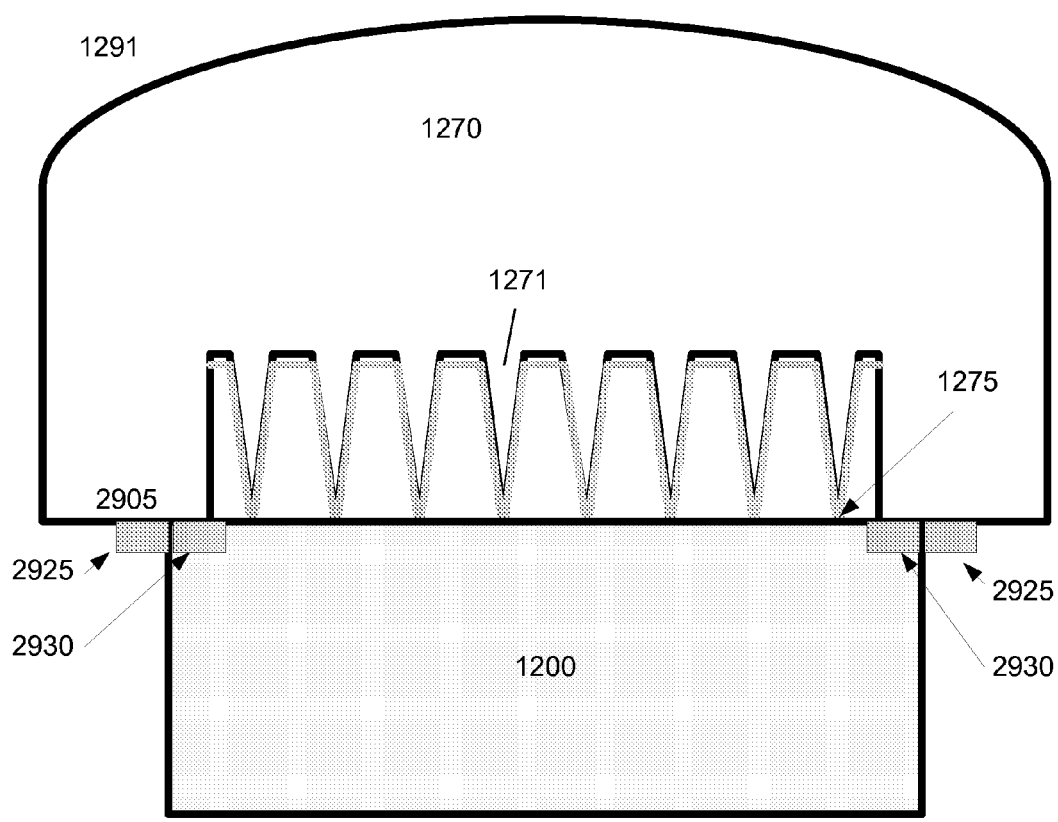

FIG. 12 depicts a device where CRTR's cores are created as part of a stamp/cover.

DETAILED DESCRIPTION

Certain figures and embodiments of the invention will be described herein by way of example to increase the understanding of different aspects of the invention.

FIGS. 1a and 1b alternately depict a short region of waveguide with insignificant variation of thickness, and are provided for simple explanation of the propagation characteristics of radiant energy within such waveguides. For the purpose of explanation, FIGS. 1a and 1b may be considered to represent a cutout of a short region of a CRTR tapered core waveguide, or a cutout of a waveguide within lateral waveguides.

FIG. 1a shows a two dimensional waveguide 100 comprising a waveguide core material 101 of thickness (width), h, formed between conductors 102 and 103. Optionally, the waveguide core material 101 could be replaced by a plurality of layers forming an aggregate optically equivalent to a uniform material having dielectric constant, $\in$, and the same overall thickness. Such construction would be recognized as equivalent by the skilled artisan.

The core may be considered to have an average relative dielectric constant, $\in$, determined using formula well known in the art and resulting in a speed of electromagnetic plane wave propagation in the bulk of the core material, $V_b = 300 * 10^6 / \sqrt{\in}$ meters per second. It is noted that $\sqrt{\in}$ is the refractive index (commonly denoted as 'k' in semiconductor manufacture field, and as 'n' in the field of optics). In the depicted example, bounding layers 102, 103 are conductors, providing mirror reflection.

The cutoff frequency, $F_{CN}$, of the Nth order mode is obtained as $$F_{CN} = NV_B/2h \text{ wherein } N \text{ is the mode order}$$

Below this cutoff frequency an electromagnetic wave cannot travel laterally along the waveguide X axis. At the critical frequency, a guided plane wave reflects repeatedly between the upper and lower conductors but makes no lateral progress along the waveguide. Above the cutoff frequency a wave travels with a dispersion equation $$\beta_N = 2\pi\sqrt{(F^2 - F_{CN}^2)}$$

Wherein $\beta N$ is wavenumber of the Nth order mode, F being the wave frequency, and FCN is the cutoff frequency as described above.

The wave has N half-wavelengths of variation across the thickness, h, and propagates with a wavelength along the guide $\lambda GN = 2\pi/\beta N$.

Higher order modes have larger values of N and have higher cutoff frequencies for the same thickness waveguide. An incident plane wave 110 at a low angle of incidence will couple best to the most uniform waveguide mode 111, so the fundamental mode is most readily coupled for incidence parallel to the waveguide.

Radiant energy incident at an angle, $\theta i$ 112, will be partially refracted 113 into the guide and partially reflected. The fraction of an incident wave admitted into the guide is determined by the integral of the incident wave front 110 with the mode shape 111. Narrow guides compared to the wavelength have a broader angular acceptance range, operate closer to their resonant condition, and have slower energy velocities.

FIG. 1b shows a similar two dimensional waveguide based waveguide 150 comprising a dielectric material 151 of thickness, h, formed between dielectric cladding materials 152 and 153. Notably, transparent conductors will act in a similar fashion, and their use is also contemplated.

The critical frequency, FCN, is obtained as $$F_{CN} = NV_B/2(h + \delta_N),$$

where $\delta N$ (depicted schematically as the dimensions indicated by 162 and 163 at FIG. 1b) represents the effect of partial penetration of mode profile 161 into the neighboring dielectric regions, and h represents the thickness (width) of the core region. It is seen therefore that while the width at which a CPS occurs may differ, the qualitative properties are similar to those of the conductor clad waveguide based transducers. We note that if δN is comparable to the cladding layer thickness, FTIR energy leakage will occur and the waveguide will have a finite propagation loss. This may or may not be desirable depending on the mechanism employed for causing energy to penetrate the cladding.

Figure 2:
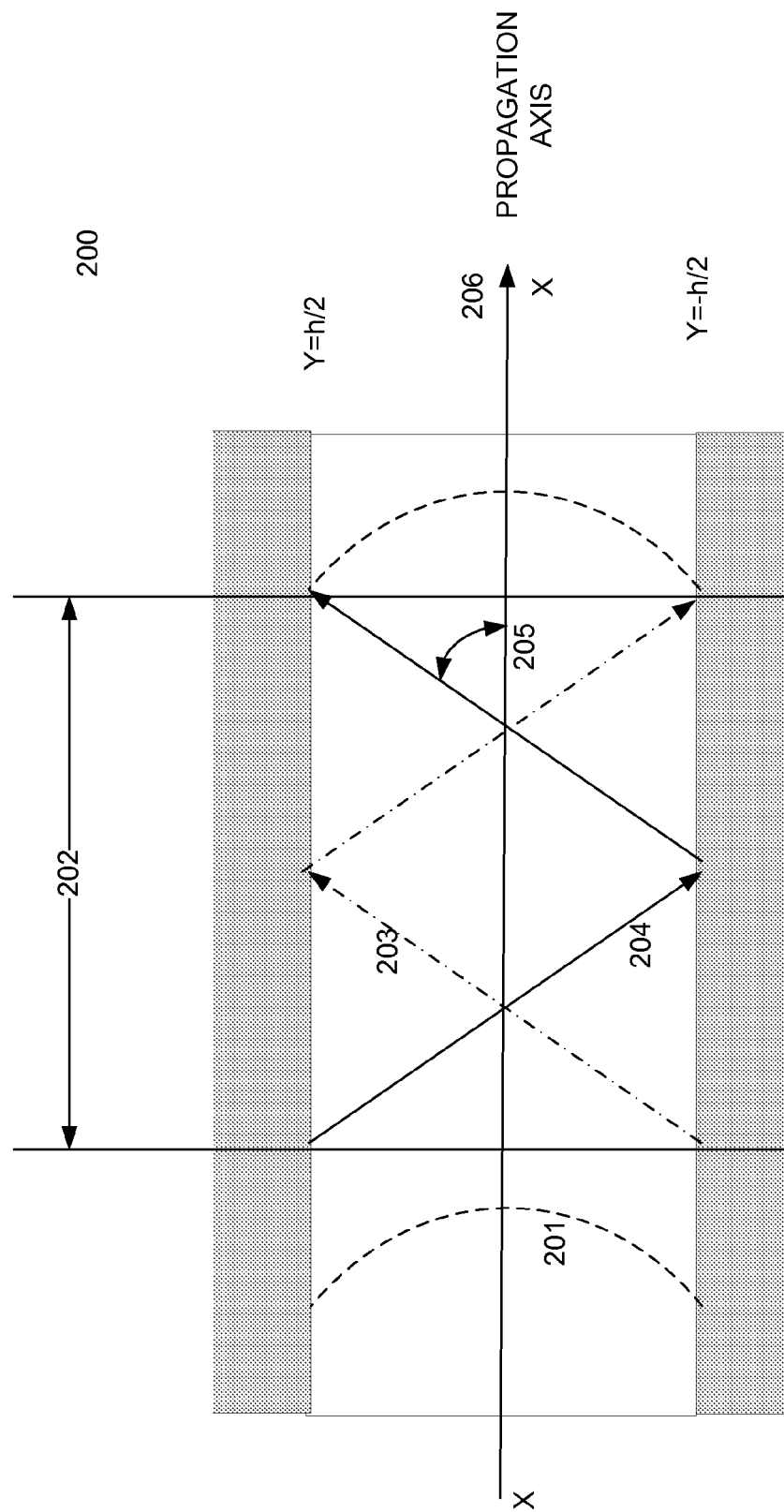
FIG. 2 depicts a simplified diagram of equivalent plane waves propagating within a waveguide being identical to a waveguide mode.

FIG. 2 depicts a waveguide 200 with extents along y of ±h/2 and propagation along x. The waveguide supports a fundamental mode with cross-section amplitude distribution 201 and propagation wave along the waveguide with a frequency-dependent period 202. The wave may be written as $$A_{(X,Y)} = \cos\left(\pi \frac{y}{h}\right) * \exp(j\beta_N X - j2\pi F t)$$

The cosine is ½ the sum of two exponentials, representing upward 203 and downward 204 plane waves. The waves make an angle 205 with respect to the propagation direction 206, given as $$\theta = \cot^{-1}\sqrt{\left(\frac{F^2}{F_c^2} - 1\right)}$$

such that as frequency, F, approaches the cutoff frequency, FC, the angle approaches 90°.

Figure 3:
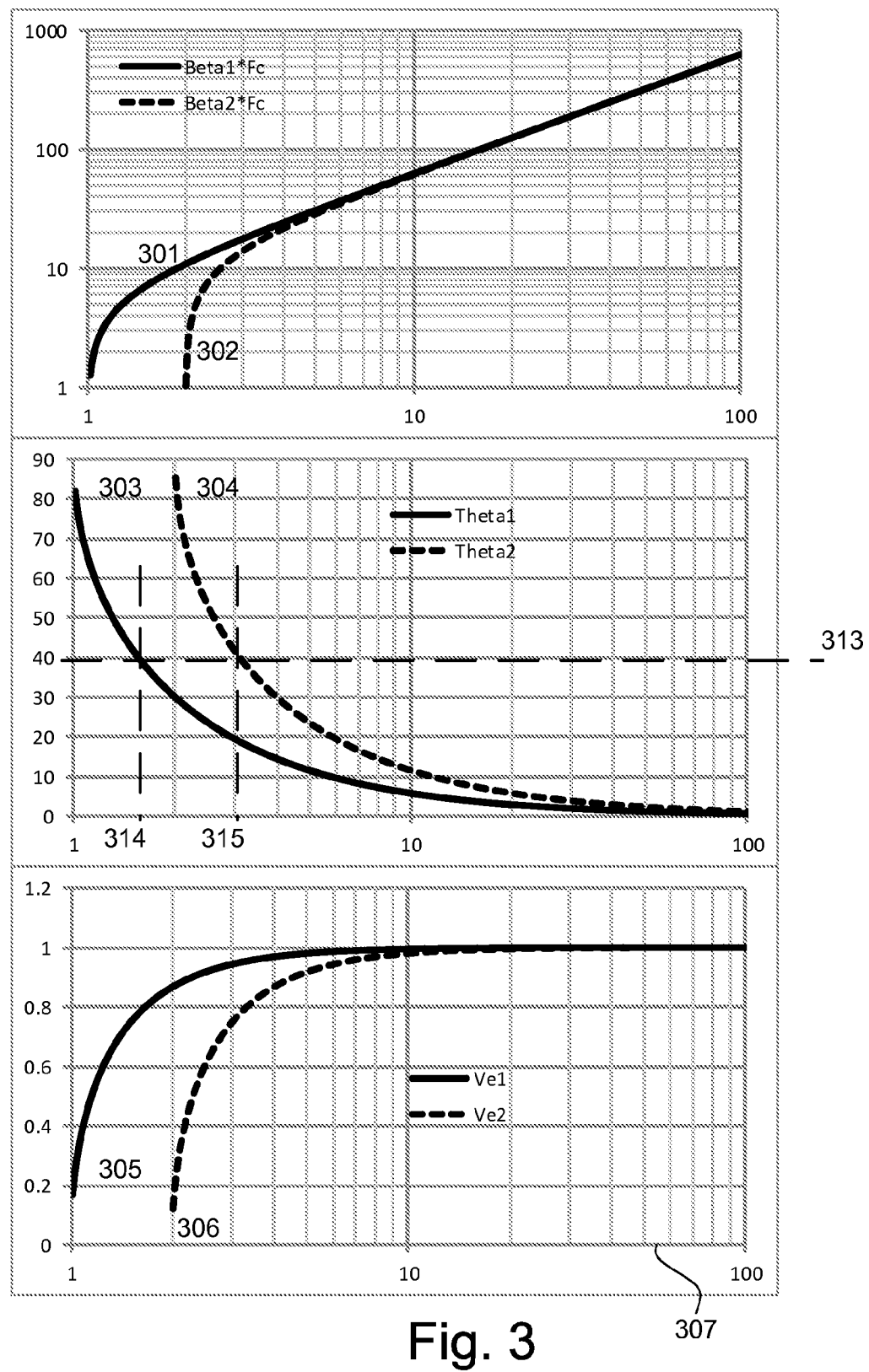
FIG. 3 depicts the wavenumber as a function of frequency, the ray angle as a function of frequency, and the energy velocity as a function of frequency for two modes of a waveguide. Imaginary wavenumbers below cutoff frequency are not shown.

FIG. 3 plots the wavenumbers, β1 301 and β2 302, having cutoff frequencies, FC1 and FC2 respectively, for a respective first and second mode of a waveguide of thickness, h, and dielectric constant, ∈. The frequency axis 307 is logarithmic and normalized to cutoff frequency FC1. In the middle graph of FIG. 3, the angle of the equivalent plane waves from parallel are also shown for the first 303 and second 304 modes respectively. The angle of the equivalent plane waves from parallel is also shown for the first 303 and second 304 modes, the critical angle θC for total internal reflection 313 and the corresponding ratio of the critical frequency compared to cutoff for the first 314 and second 315 modes being shown for a dielectric-clad waveguide. In the bottom graph of FIG. 3 the energy (or group) velocity, VE1 305 and VE2 306 are shown normalized to the bulk speed of light in the material, VB. As shown, the respective group velocity is zero at the cutoff frequencies and then rapidly approach VB at high frequencies. The area where the group velocity slows significantly relative to VB is easily distinguished.

A wave at high frequency relative to the waveguide's cutoff frequency will travel effectively at the speed of light in the bulk material VB, with a very low angle relative to the propagation axis of the waveguide. Such a wave has a very shallow angle of incidence on the boundaries of the waveguide and is said to have grazing incidence. By way of example, a wave having a frequency about six times the cutoff frequency has an angle of incidence of about 10° and travels at effectively the speed of light in the waveguide core material.

While the examples provided in FIGS. 1a, 1b, and 2 were provided using two dimensional waveguide, extension of the above to a three dimensional waveguide of finite extent in z is well known in the art and similar expressions for the cutoff frequencies and dispersion relationships will be clear to the skilled in the art in light of the present specifications.

Having considered the idealized waveguide shown with constant width at FIGS. 1a, 1b, and 2, attention is now given to the effect of tapering in a CRTR having a tapered waveguide core.

As described above, a CRTR may be operated in one of two fundamental modes generally referred to as a 'splitter mode' and a 'combiner mode', and further in hybrid and reflective modes. The more detailed explanation will first concentrate on the splitter mode.

Figure 4:
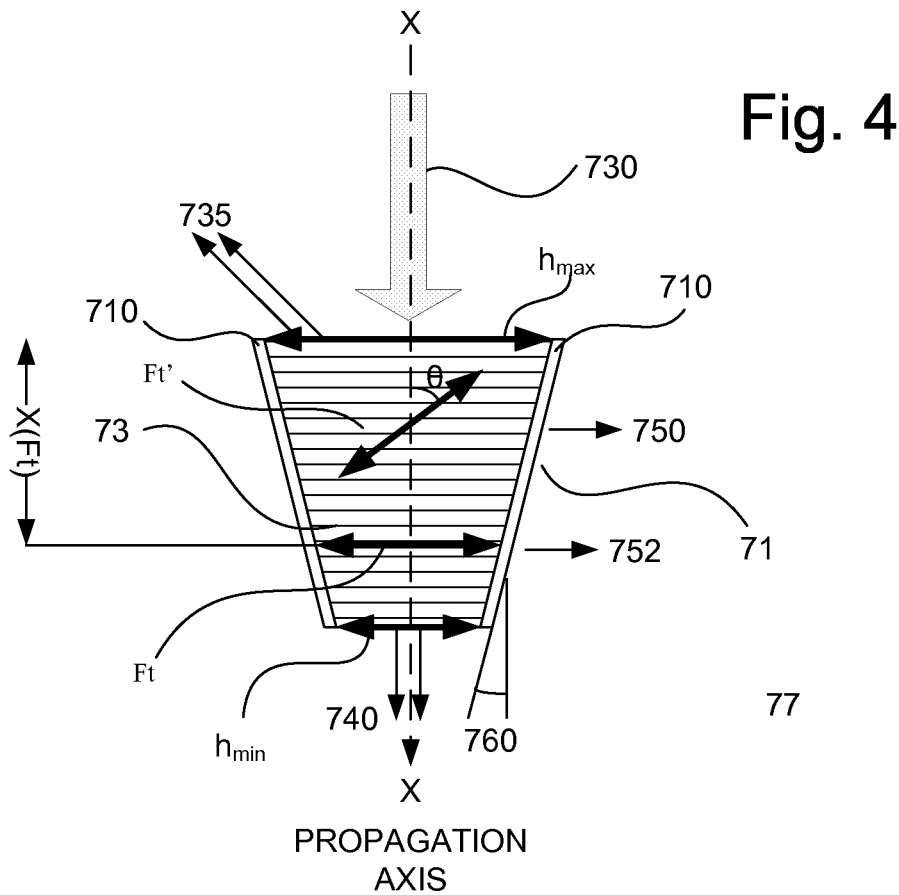
FIG. 4 depicts a cutout of a simplified Continuous Resonant Trap Refractor (CRTR).

FIG. 4 depicts a cutout of a simplified Continuous Resonant Trap Refractor (CRTR) which is a waveguide having a tapered core 73 and a cladding 710, and dimensioned as described below. In splitter mode the CRTR allows a wave in the spectral range of interest to propagate in the core until it reaches a cladding penetration state at a frequency dependent width, which is also a frequency dependent depth due to the core taper. The core and cladding are selected to allow the wave to propagate in the waveguide and to depart the waveguide via the cladding. The tapered core 73 has a wide end denoted in FIG. 4 as $h_{max}$ defining an aperture, and a narrow end $h_{min}$ referred to as a tip. The core is surrounded at least partially by cladding walls 710, which are conductive or have a lower refractive index than the refractive index of the core. The core region may comprise a single region or a plurality of dielectric regions, and in some embodiments a fluid is utilized as the core material. It is noted that the cladding may extend only partially about the core, but the portion which is considered as the waveguide is the portion of the core bounded by cladding at least in two opposing sides of one width direction.

At any depth, the core 73 has a corresponding plurality of width dimension(s) transverse to the depth dimensions, the width dimensions for a given depth defining a width plane transverse to the depth dimension. The width plane dissects the tapered core to form a two dimensional cross-section. Stated differently, the width being any direction lying in plane transverse to the depth directions, i.e. a plane that is penetrated by the depth dimension and is substantially perpendicular thereto. The core cross-sections may be of any geometry and form, and may be symmetrical or asymmetrical. By way of example, $h_{max}$ and $h_{min}$ and Ft denote width extending on both sides of the depth dimension X-X, and each is on a different width plane. Notably, while those examples denote symmetry about the at least two sides of the depth axis, such symmetry is not required, and other width dimensions on the respective planes may or may not be of varying magnitude. However, by virtue of the taper, considering at least two width planes, the plane closer to the aperture will have at least one width dimension having a larger magnitude than at least one width dimension magnitude on the plane that is closer to the tip. While in the example depicted in FIG. 4 the cross-sections are received from a pyramid or a cone with the clipped apex, any desired shape may be selected as long as the width direction is reduced as a function of depth. In the depicted example, the taper forms angle 760 from the vertical.

Electromagnetic radiant energy admitted via the aperture propagates in the core generally along the depth dimension X-X The tapered core waveguide guides waves from the aperture, generally along the depth dimension X-X extending from the aperture $h_{max}$ towards the tip $h_{min}$. The depth being an axis which extends indefinitely, and in these specifications increases from the aperture towards the tip, such that larger depth implies greater distance from the aperture.

The electromagnetic radiant energy waves admitted via the aperture propagate along the depth dimension until such waves reach a plane of sufficiently constricted cross-section, to cause the wave to reach a cladding penetration state. The width of the CRTR core which causes the CPS for a wave of a given frequency is termed the 'emission width' for that wave. The distance of an emission width for a specific wave from the aperture, when measured along the depth direction, is referred to as 'emission depth'.

The core width is dimensioned such that when multi-frequency energy is admitted through the aperture and propagates along the core depth, it will cause a lower-frequency spectral component to reach a cladding penetration state at a first depth, and the core will further taper to a width that will cause energy of a higher-frequency spectral component to reach a cladding penetration state at a second depth, the second depth being larger than the first depth.

Therefore, for a given CRTR spectral range of interest $S_i$, ranging between $\lambda_{max}$ to $\lambda_{min}$ which represent respectively the longest and shortest wavelengths of the spectral range of interest as measured in the core material, wherein $\lambda'$ is at least one wavelength in $S_i$, the dimensions of a frequency splitting CRTR taper are bounded such that a. the aperture size $\psi$ must exceed the size of one half of $\lambda_{max}$;
b. the CRTR core size must also be reduced at least in one dimension, to at least a size $\zeta$ which is smaller than or equal to one half of wavelength $\lambda'$.

Thus the CRTR dimensions must meet at least the boundary of $\{\zeta \leq \lambda'/2 < \lambda_{max}/2 \leq \psi\}$ where the CRTR sizes defined above relate to a size in at least one dimension in a plane normal to the depth dimension. In FIG. 4 the aperture size $\psi = h_{max}$. It is noted however that not all waves in $S_i$ must meet the condition b. above. By way of example, certain waves having shorter wavelengths than $h_{min}/2$ may fall outside the operating range of the CRTR. Such waves which enter the CRTR will either be emitted through the tip, reflected back through the aperture, or absorbed by some lose mechanism.

Notably if a third spectral component $\lambda''$ is present, and has a higher frequency than $\lambda'$, it may be emitted at greater depth than $\lambda'$ or be emitted via the tip if the tip is constructed to pass a spectral component of frequency $\lambda''$, or it may reflected or absorbed.

The CRTR aperture is dimensioned, when operating in splitter mode, to allow the entry of a spectral component having at least the lowest frequency in the spectral range of interest, which means that the longest wavelength in the spectral range of interest for the CRTR is defined by the aperture width in at least one dimension. Notably, the spectral range of interest may be limited by other considerations to shorter wavelengths. The core taper in at least one dimension which must encompass both the emission width of the longest wave in the spectral range of interest as well as an emission width of at least one shorter wavelength within the spectral range of interest. The CRTR either will taper to less than the emission width of the shortest wave in the spectral range of interest or will allow the final portion of the spectral range of interest to exit vertically at a truncated tip of the core. Larger widths than those emission widths at the inlet aperture, or smaller widths than those emission widths at the tip, are allowed.

If the tip is truncated or otherwise allows passage of at least some of the spectral components that were admitted by the aperture, the highest frequency in the spectral range of interest for the CRTR is defined by the longest wavelength that will be emitted via the cladding. If the tip does not allow energy to pass therethrough, the highest frequency in the spectral range of interest for the CRTR is the highest frequency to be emitted via the cladding, and detected or reflected by any desired manner.

The spectral range of interest for a CRTR operated in mixer mode is the range between the highest and lowest frequencies of radiant energy injected into the tapered core via the cladding. In hybrid and reflective modes of operation the spectral range of interest for the CRTR is a combination of the above ranges, as dictated by the application at hand. Notably, all of those spectral ranges of interest are defined for the CRTR. Portions of the CRTR or other elements of the invention may have different ranges of interest.

The cladding penetration mode of the CRTR may be CPS-FTIR, or CPS-SRC, or a combination thereof.

As described above, waveguides have a cutoff frequency, which is dictated by the wavelength in the waveguide materials, and the waveguide width. As the frequency of the energy propagating in the waveguide approaches the cutoff frequency Fc, the energy propagation speed along the depth of waveguide is slowed down. The energy propagation of a wave may be considered as having a depth dependent varying angle θ relative to the propagation direction, and thus also relative to the cladding, until a CPS is reached.

If the cladding walls are comparable in width, w, to the skin penetration depth, δ, then energy will transfer across the cladding through frustrated total internal reflection (FTIR) with a transmitted power fraction proportional to exp(−2w/δ).

Similarly, if metal cladding is used, and the metal cladding is on the order of the skin penetration depth, δ, which is determined by the resistivity, ρ, radian frequency, ω=2πF, and permeability, μ, as $$\delta = \sqrt{\frac{2\rho}{\omega\mu}},$$

then energy will also partially transmit through the metal cladding in proportion to exp(−2w/δ).

While operating in splitter mode, refraction by the CRTR occurs in such fashion that spectral components exit the cladding along its side. Even for metal-clad waveguides in which the cladding penetration state may in some cases be reached near the stationary resonance condition, refraction is seldom or never perfectly perpendicular to the waveguide axis. This angle will in most cases be closer to 90° in conductor clad waveguide and further from 90° in dielectric cladding. The angle may be computed utilizing the refractive indices of the core material, the cladding, and any surrounding medium, by simulation, or may simply be determined empirically.

Energy 730 in the spectral range of interest is incident on the waveguide at its aperture, at an angle which permits energy admission. Waves having a lower frequency than the cutoff frequency $F_{min}$ are reflected 735. Waves 740 having frequency higher than $F_{max}$ exit through the tip of the tapered waveguide if an exit exists. Waves having a frequency between $F_{min}$ and $F_{max}$ will reach their emission width, and thus their cladding penetration state, at some distance from the aperture of the waveguide depending on their frequency, as shown schematically by arrows 750 and 752.

In general terms then, when multi-frequency radiant energy is admitted through the CRTR aperture, lower-frequency waves will reach their emission depth before higher-frequency waves, due to their longer wavelength and the taper of the core. As the wave energy departs the CRTR at its emission depth, lower-frequency wave would penetrate the cladding and exit closer to the aperture than higher-frequency wave. Thus, the CRTR will provide spatially separated spectral components along its cladding, while at the same time refracting the spatially separated energy away from the depth axis of the CRTR.

Examining the behavior of a wave of arbitrary frequency $F_t$, where $F_{min} < F_t < F_{max}$, which enters into the waveguide at its aperture at an incidence angle nominally parallel to the propagation axis X-X, the angle θ between the wave and X-X will vary as the wave propagates along the X-X axis due to the narrowing of the waveguide and increase of the cutoff frequency, as depicted schematically by $F_{t'}$. As the wave approaches emission depth $X(F_t)$ where either the tapered waveguide cutoff frequency equals or nearly equals $F_t$, or the angle θ approaches the critical angle $θ_C$, the wave cannot propagate any further within the CRTR core. The wave $F_t$ is thus either radiated through the cladding of the waveguide or is trapped in resonance at depth $X(F_t)$. Considering a perfectly reflective cladding, for a continuum of waves of different frequencies $F_{min} < F1, F2, \ldots F_x < F_{max}$, admitted via the aperture of the tapered waveguide 71, the waveguide becomes a continuous resonant trap, in which without cladding penetration the waves of different frequencies become standing waves, trapped at resonance in accordance to their frequency along the X-X axis. Such trapped waves however are either leaked through the cladding by the finite probability of "tunneling" though the cladding or are lost to absorption in the waveguide. If the cladding may be penetrated, the tapered core waveguide becomes a continuous resonant trap refractor (CRTR), as the waves are also refracted from the depth axis. This refraction allows directing specific spectral components of the incoming spectrum to predetermined target zones and provides special separating of the spectrum.

The skilled in the art would also recognize that while this simplified explanation describes waves entering the CRTR in parallel orientation to the X-X axis, the operation will be similar on waves having any angle of incidence which is admittable by the waveguide construction.

The tip may be open in the sense that it does not hinder passage of some radiation therethrough, or closed in the sense that it blocks at least a portion of the spectral range of interest. In embodiments where the tip does not taper to a point, energy 740 may be allowed to exit the tip end of the CRTR, or a mirror may be formed at the tip, to reflect unwanted energy back through the aperture.

Figure 5A:
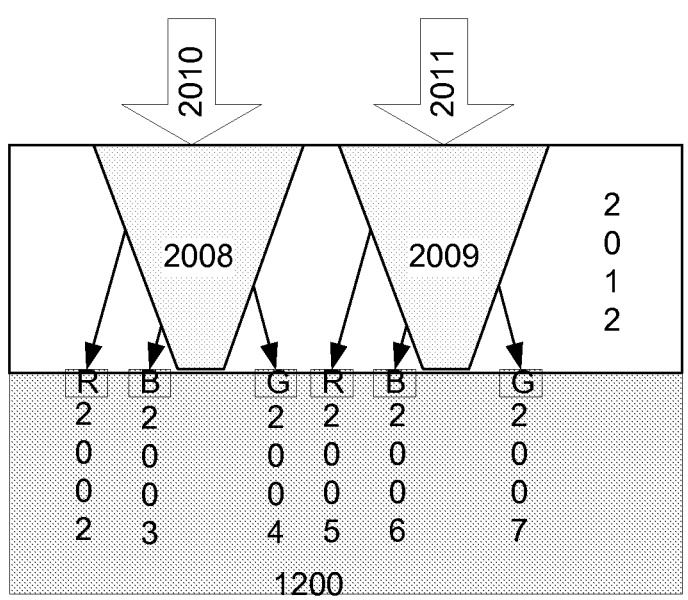
FIG. 5a depicts an embodiment with a bulk material stratum.
Figure 5:
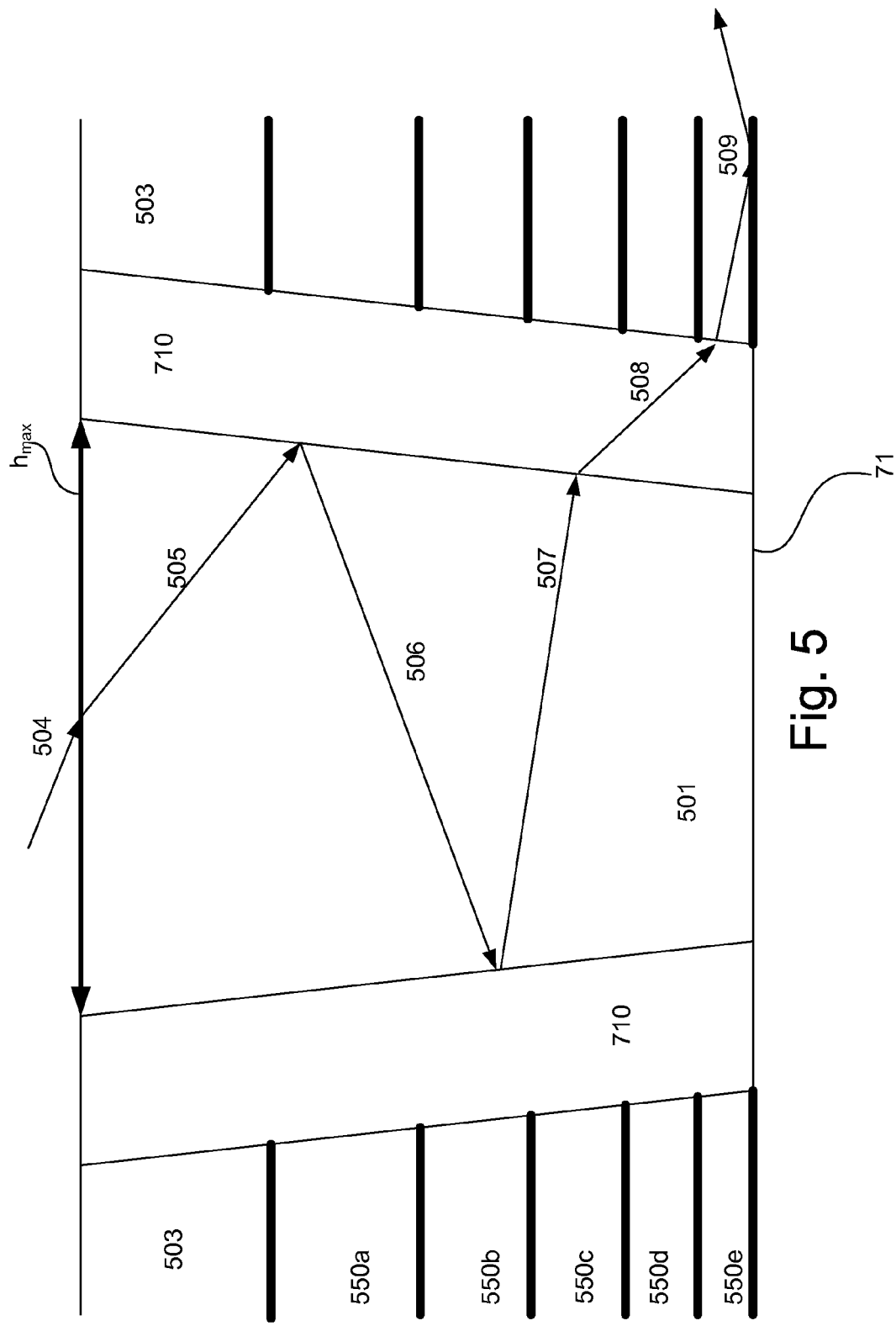
FIG. 5 shows a cutout of a CRTR embedded in a stratum comprising lateral waveguides.

FIG. 5 shows a cutout of a stratum 503 in which a CRTR 71 is embedded. The stratum in this example comprises lateral waveguides—a plurality of stacked waveguides 550*a-e*, into which the energy entering the aperture $h_{max}$ is coupled in a frequency sorted fashion. The figure depicts a simplified path of a wave 504 incident onto a tapered waveguide core 501 and refracted into a waveguide mode. The waveguide mode is generally illustrated by rays 505, 506, and 507 of ever larger angle relative to the waveguide boundary. In the case of a dielectric clad waveguide, there exists a critical angle beyond which total internal reflection will not occur and the wave is refracted instead of reflected. At a location along the waveguide where the width is slightly larger than that resulting in a SRC, the ray angle will exceed the critical angle for total internal reflection and will instead be refracted 508 in the cladding 710. Stated differently, the ray will reach its emission width and thus its cladding penetration state. For dielectric clad CRTR, the ratio of the core and cladding dielectric constants determines the critical angle above which total internal reflection cannot occur. Below this angle, and therefore above a critical frequency, there is a finite penetration, δ into the cladding. Note that δ increase with decreasing frequency. At a critical emission depth, above the cutoff frequency, the critical angle for total internal reflection is reached and the wave will no longer be guided and therefore exits the CRTR before the cutoff frequency depth. If the structural material of waveguide 550*e* has an index of refraction higher than that of the cladding, then the ray will refract again, becoming trapped in judiciously located lateral waveguide 550*e*, and will propagate 509 in that waveguide. The ratio of the cladding and transducer dielectric constants determines the angle of emission, which will always be directed downward slightly from perpendicular for a cladding having lower refractive index than that of the core.

Spectral components of lower frequencies will exit in a similar manner at a wider point in the tapered waveguide 501, being directed to earlier lateral waveguides such as 550*a-d*, and higher frequency spectral components will exit deeper into the tapered reflector (not shown).

The energy may be directed to transducers which may be detectors for detection of different frequencies, to absorbers for harvesting electrical energy, to RL type transducers, or to any combination thereof. If a specific frequency is reflected back into the CRTR core by a RL transducer or even a simple fixed reflector, it will be emitted via the aperture. In the case of combiners, the lateral waveguide may have light sources embedded therein. The transducers may be housed within the stratum or outside thereof. FIG. 5*a* depicts an embodiment where the stratum 2012 comprises bulk material in which the sorted energy propagates. In the depicted embodiment, the CRTRs 2008 and 2009 separate incoming light into Red, Green and Blue (RGB) primary colors, and those colors are detected respectively by transducers 2002, 2003, and 2004 for CRTR 2008, and transducers 2005, 2006, and 2007 for CRTR 2009, The transducers are shown in a substrate 1200. While this is one alternative construction, the transducers may be located in the stratum, and/or in lateral waveguides, and the selection of the location of the transducers is a matter of technical choice.

As noted, CRTR use may extend to the millimeter wave range (EHF), or even to the microwave range. Depending on where between cm waves and micron IR the range of dielectric constants available increases dramatically. By way of example, water has an index of refraction of nearly 10 at radio frequencies but only 1.5 at IR to UV. There are numerous optical materials with low and high index at mm wave frequencies and below. Thus while the principles of operation of CRTRs are similar, the materials and sizes differ. A millimeter/microwave operated CRTR is a channelized filter integrated into a horn antenna wherein the channelized ports are lateral to the horn and the in-line exit port is a high pass filtered output for a broad band input. Such device may be utilized as a an excellent front end for a multiplexer/diplexer, and as a general purpose antenna that has excellent noise figure and improved anti-jamming as those characteristics are determined at the front en of devices which use them.

Figure 6:
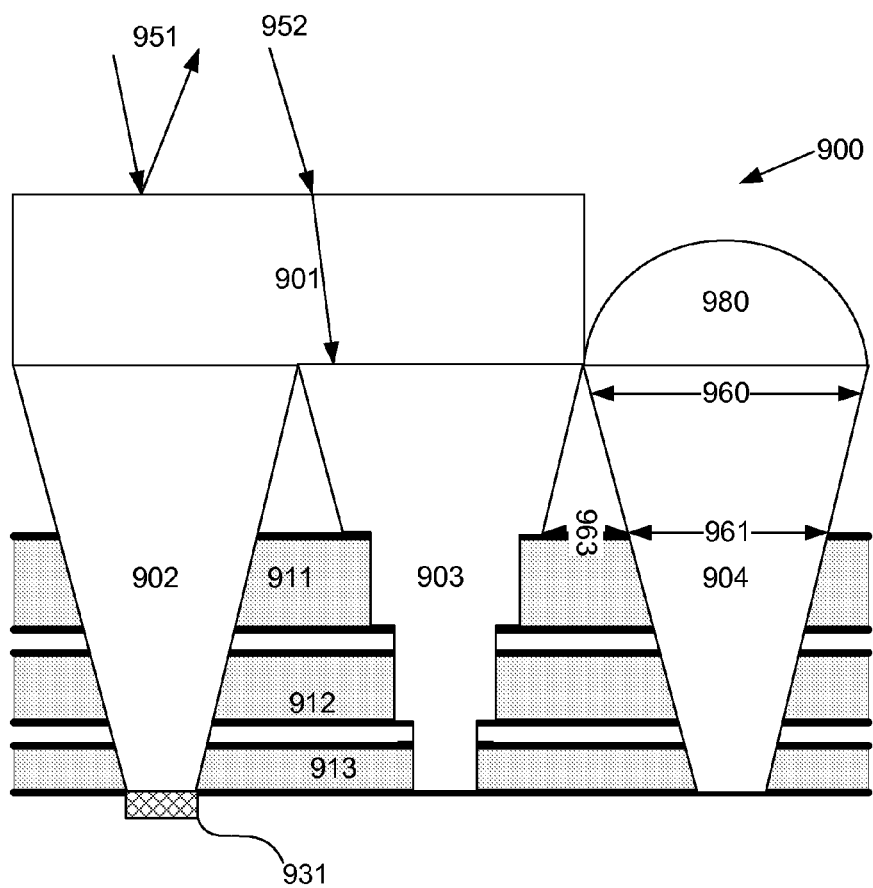
FIG. 6 depicts a cross-section of a CRTR array 900 with several optional construction details.

FIG. 6 depicts a cross-section of a CRTR array 900 with several optional construction details. An optional lens 980 may be disposed on top of the CRTR or on top of high pass filter 901. In certain embodiments, the high pass filter is incorporated into the lens. Use of a lens can modify the angle of acceptance of CRTR. The apertures of CRTRs 902, 903, and 904 are contiguous or nearly contiguous at the inlet surface, providing effectively complete collection of incident radiant energy. By making the apertures 960 of the CRTRs wider than the critical width at the lowest frequency of interest, $F_{MIN}$, 961 all desired frequencies are accepted into the waveguides. A tradeoff exists where the wider the aperture, the narrower the acceptance angular range for any given frequency of light. Managing that tradeoff is an implementation dependent engineering choice. As the refractors taper, there exists space therebetween 963 for transducers 911, 912, 913. FIG. 6 further presents two optional features, namely the stepped taper present in the core of CRTR 903, and an optional excess handler 931, at the tip of CRTR 902. Radiant energy having higher frequency than a desired range may be handled by an excess handler 931. Excess handler 931 may be a reflector which reflects energy of shorter wavelengths than the energy that was refracted through the cladding back towards the aperture, and the energy is reflected from the CRTR. Alternately the excess handler 931 may be a high energy transducer located at the CRTR tip to convert all of the energy that was not refracted. Use of an excess handler is advantageous to reduce heat buildup, and other ill effects of such energy, or for maximizing the energy recovery of the device. Thus, by way of example if the CRTR is designed to receive light from the IR range to the purple, UV energy which enters the CRTR is reflected by a reflector that acts as an excess handler 931, and is re-radiated outside the aperture, preventing damage to UV sensitive materials within the CRTR or its surrounding media.

CRTRs may be manufactured by a variety of methods, and are generally embedded in a stratum in most cases. The stratum may form a single material which allows radiant energy of the spectrum of interest to propagate therethrough, or may contain a plurality of transducers arranged in layers such that each transducer is positioned to receive its own spectral component from the CRTR. A common way comprises providing the desired stratum, and forming pits therein by processes such as ion milling, reactive ion etch, focused ion beam, and the like, the cladding material is then deposited into the pits, and the core is formed thereabove. In another exemplary manufacture, the CRTRs are formed by providing a substrate, forming pits therein, flowing cladding material and providing a 'stamp' which is an object that has CRTR cores protruding therefrom. The stamp may be removable or form a portion of a device once manufacture is complete. In certain embodiments, the pits are tapered, and in certain embodiments the pits have vertical walls, which simplifies manufacturing. Cladding material may be disposed on the lens/stamp, or may be present in the pits prior to alignment and mating. In some cases the cladding may be a fluid which may or may not be solidified at a later stage. The stamp may be removed in certain embodiments, but may also form a portion of the resulting device, such as forming a lens, a high pass filter, a sealant portion, a mount and the like.

In the case of conductive cladding material the dielectric constant of the core material 606 is arbitrary. However if the stratum comprises lateral waveguides which may be shorted by the cladding, a dielectric intermediate material is needed.

It is noted that light emitters disposed about the cladding are able to couple waves into the CRTR at frequency selective locations, resulting in light emitted at the aperture of the CRTR being the combination of light inserted along the CRTR. Thus the CRTR becomes a linear optical mixer or combiner (the terms mixer and combiner being used interchangeably). While light is utilized in the following example, the spectrum of interest may cover any portion of the spectrum.

Figure 7:
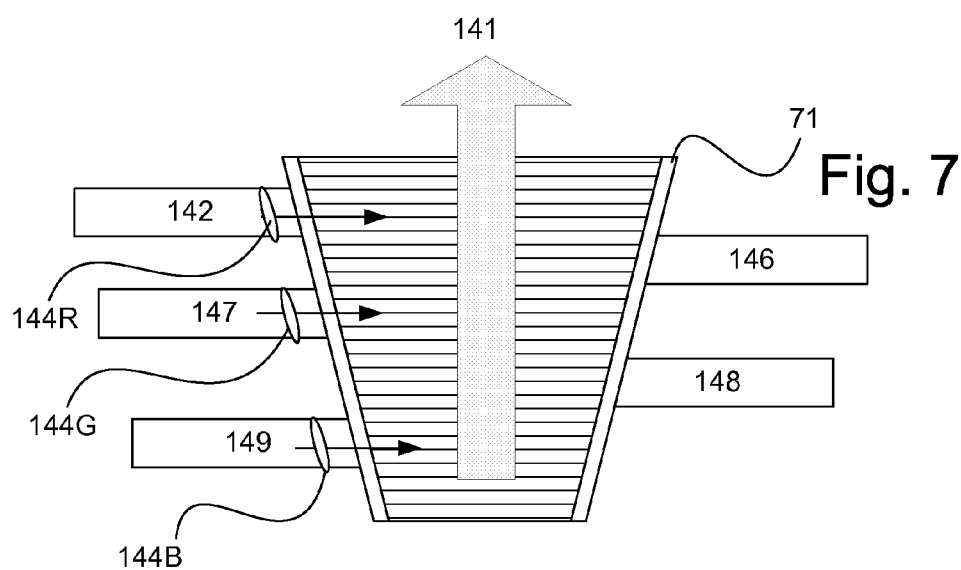
FIG. 7 depicts a CRTR acting as a combiner, in combination with optional optical switches.

FIG. 7 depicts a CRTR acting as a combiner, in combination with optional optical switches. Radiant energy sources 142, 147, 149, are each of different frequency, which by way of example would be considered to be red, green and blue, respectively. The radiant energy sources are disposed such that their emission will be inserted to the tapered core adjacent to, or at, the cladding penetration depth for their respective frequency to provide good coupling into the CRTR, or stated differently, at their coupling depth. Alternatively the coupling depth may be set for a higher order mode of the wave being coupled. As the radiant energy is presented beyond the critical angle of the cladding, it will penetrate the cladding, the energy will be admitted into the core and will be mixed with other injected spectral components. The combined multi-spectral radiant energy 141 will be emitted from the aperture of the CRTR, after accounting to losses within the structure.

Stated differently, energy emitted from energy sources whose output is to be mixed, would follow a path via an intermediate material such as the lateral waveguide core, buffers, and/or other material, to the cladding, and thru the cladding to the CRTR core. For best coupling of the energy to the core, the coupling depth will be about the fundamental half wavelength of the frequency being injected.

Optionally, light modulators 144R, 144G, and 144B, such as liquid crystal material, switchable mirrors, and the like, are provided to modulate light entering the CRTR. Optionally, in an array of CRTRs, use of such optical switches will allow usage of a single light source 142, 147, 149 to provide controlled light to a plurality of CRTRs.

The choice of the number of light sources and waveguides is not limited to three or to the specific colors in this example. White light may be used, obtaining similar results by relying upon the filtering inherent in coupling to the CRTR, and the white light would act instead of, or in addition to, one or more individual light sources 142, 147, 149. The same principle of operation may be utilized to combine other portions of the spectrum, such as MWIR, LWIR, EHF, and the like.

In some embodiments, light modulators 142, 147, and 149 act as controllable reflectors, namely a RL transducer, and are disposed about the CRTR and selectively reflect at least a portion of the light refracted from the CRTR core, back to into the CRTR core. In the example depicted in FIG. 7, The light reflected into the core will be emitted back out via the aperture. The resulting reflective pixel will thus re-radiate a selectable portion of the original aperture-emitted spectrum, to provide an outputted light of a desired color, while the energy not reflected will be absorbed into the stratum, or otherwise directed away from the aperture. By reflecting light of the primary colors at varying proportions back into the CRTR core, a wide range of perceived colors may be outputted from the aperture. Such structure provides a pixel operating passively from incoming light and utilizing merely the power required to maintain the RL transducers at a desired state. By way of example, such reflecting light modulators may be created from LCDs which require very low energy, from micro-mirrors, by way of example, but piezoelectric, piezomagnetic, and certain semiconductor combinations may be utilized. An array of CRTR based pixels combined with RL transducers will form a passive, "true-color" display panel, optionally with different colors and at different polarizations. Arrays of passive pixels utilizing reflected light may be utilized to form very low power display panel, similar to those colloquially known as "digital ink" or E ink" displays.

If energy transducers are placed in combination with light sources or reflectors along a CRTR's depth direction, the combination may be utilized for a combined power harvesting device and a display. Thus, by way of example, if 144R, 144G, and 144B are controllable reflectors or light sources located at emission depths of red, green, and blue colors respectively, energy harvesting transducers 146 and 148 may be disposed at emission depths differing from those primary colors, and the energy harvested therefrom may be utilized to power light sources or refractors, and their adjoining driving circuitry. Panels containing a plurality of CRTRs embedded in supporting material containing energy harvesting transducers in combination with reflectors or light sources will provide a self energizing panel which may be used for self powering digital ink displays, an active light emitting panel, or a panel with large grain color change, such as covering panels for structures, vehicles, and the like.

Circular CRTR apertures offer polarization independent emission from the CRTR, where the polarization depends only on the radiant energy admitted via the aperture. In combiner mode energy emitted from the aperture will be polarization neutral, and in a CRTR operating in splitter mode, energy will be emitted from the CRTR periphery will be polarization neutral. However, CRTR tapered cores do not require geometrical symmetry, nor a constant width about the depth axis. If desired, cross-sections such as elliptical, rectangular, and other geometries may be used to provide a CRTR with polarized response, if such is desired.

The devices shown in FIGS. 8*a*-8*e* permit individual detection or control with respect to a plurality of energy polarizations.

Figure 8A:
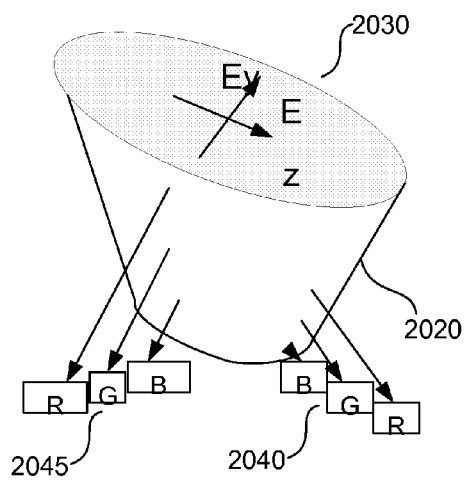

FIG. 8*a* depicts a CRTR with elliptical core cross-section in a width plane, by way of example of but one possible asymmetrical CRTR 2020. Radiant energy of polarization Ey would enter the CRTR aperture 2030, and would exit the CRTR and impinge on a surface or a transducers group 2045, while light entering the CRTR with polarization Ez would impinge on the surface or a transducers group 2040 at a different depth. It is noted that the elliptical shape is not mandatory and other elongated shapes are also considered.

Figure 8C:
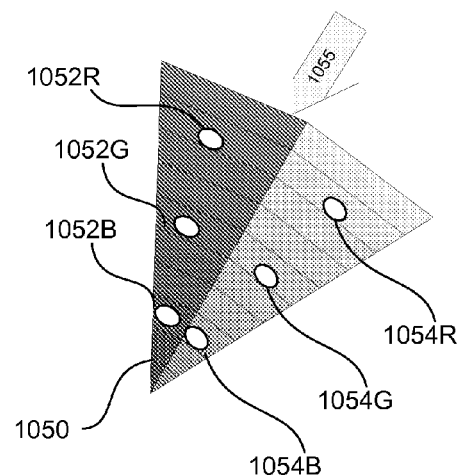
Figure 8B:
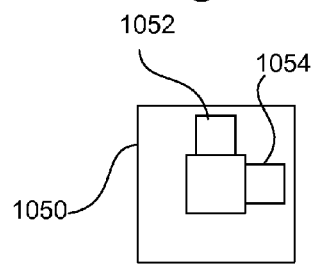
Figure 8D:
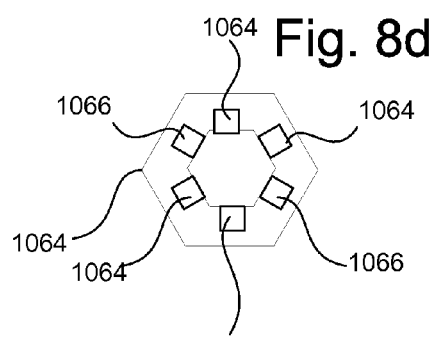
Figure 8E:
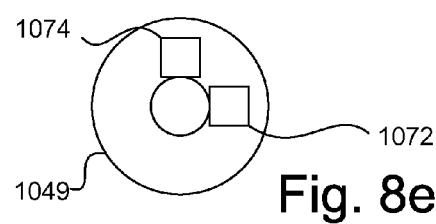

FIGS. 8*b*-8*d* represent a simple example of a multifaceted symmetrical CRTR core. Using multifaceted core such as square, hexagonal, octagonal shapes and the like provide multi-polarization separation. FIG. 8*b* represent an elevation and 8*c* represents a perspective view of one CRTR having a square core 1050, and transducers 1052 and 1057 which will detect energy at respective 90° polarization to each other. While 8*b* depicts transducers for a single frequency but with differing polarization, FIG. 8*c* shows the combination of frequency and polarization detection or mixing. While the CRTR 1050 operates in splitter mode, radiant energy 1055 is admitted to the CRTR core 1050 via the aperture and travels along the depth direction towards the tip. The energy is divided between the different transducers groups 1052 (R, G, and B), 1054 (R, G, and B), such that each transducer receives a spectral component separated by polarization as well as by frequency. Thus by way of example, the pair 1052*r* and 1054*r* would each receive a spectral component of a red frequency, but of differing polarization, and similarly transducers 1052*g* and 1054*g* would receive a spectral component of a green frequency but with differing polarization, and transducers 1052*b* and 1054*b* will have the same with blue frequency. Clearly, if desired a single frequency band may be detected by including only a pair of transducers, or polarization only may be detected for a wider range of frequencies by directing the multi-frequency spectral components emitted from varying depths into a single transducer for each polarization.

Asymmetrical tapered core cross-sections operate similar to multifaceted cores, where energy is sorted by polarization according to the shape axes. Not every asymmetrical cross-section would result in usable polarization dependent spectral separation, but generally shapes having a plurality of axes, and especially shapes having symmetry about at least one of the axes, while not necessarily about all axes, will tend to exhibit polarization selectivity. However for brevity it is assumed that when 'multi-faceted symmetry' core is used, unless clear form the context, the term extends to include asymmetrical core shapes that function to provide polarization selectivity.

As the CRTR was shown to act symmetrically in splitter mode, the same arrangement would act to mix spectral components of narrow band energy sources, into a broader, multi-frequency radiant energy, where the narrower spectrum sources would be directed towards the core and couple thereto at an angle projected on the width plane. In combiner mode, energy is inserted to the CRTR through the cladding and is outputted via the aperture. Thus if the units marked transducers 1052 and 1054 (R, G, and B, respectively) represent a plurality of light source at different angular locations about the depth dimension of the CRTR, it would result in polarized light corresponding to the location and frequency of the light sources being emitted from the aperture. An exemplary top view is provided in FIG. 8*e*, where light sources 1072 and 1074 are disposed about the CRTR at 90° relative angle, which will result in individually controlled horizontal and vertical polarized light emitted from the CRTR aperture. It is noted that additional energy sources may be disposed on the opposite sides of the CRTR. The depicted round shape of the CRTR is representative of any desired core shape.

The skilled in the art would readily recognize that a hexagon would provide light polarized at 120° as depicted by hexagonal CRTR 1060, where each of the transducer pairs 1062, 1064, and 1066 detects incoming energy polarized at 120° respectively. Similarly, octagonal CRTR would provide 45° relative polarization separation, and the like. It is noted that even if the core is formed into such cross-section at only a portion of its depth, the polarization of the polarized light or a portion thereof would be so filtered into the various components due to the physics of cladding penetration and waveguide resonance and detection of a plurality of polarization is thus enabled.

The following is but one example provided to demonstrate design considerations for a CRTR. In order to meaningfully discuss dimensions in a CRTR, first the angle-dependent transmissivity through a dielectric for a parylene-N cladding (n=1.661) and AIN core (n=2.165) in a stratum with n=2.2. The critical emission angle is 39.9° and occurs when the frequency is 1.556 times the resonant trapping frequency.

Three-quarters of the available power at a given frequency will penetrate the cladding over an angular arc from the −6 dB point to just above the critical angle. It is desired that the emitted beam be as narrow as possible and emit over as short a region of CRTR walls corresponding to the depth direction as possible. A basic span of 2° of arc is selected in the design example provided herein. In Parylene-N this condition is achieved at a thickness of $0.137\lambda o$, where $\lambda o$ is the free space wavelength. Realizing that the wavelength is shortened by 1.661 in parylene-N, the thickness normalized to the local wavelength is $0.228\lambda'_{clad}$. Preferably the thickness would be at least $0.243\lambda o$ ($0.4\lambda_{clad}$) to obtain less than 1° of angular spread. This relationship shows the advantage of having the thickness of the cladding change as a function of the depth to optimize transmissivity of each wavelength.

At another extreme, all tolerances are relative to the dimension being controlled. Making a CRTR pit thicker than the target and then backfilling with cladding, as is done in some embodiments, results in a CRTR tolerance that is the sum of an error proportional to the pit diameter plus an error proportional to twice the cladding thickness. At a thickness of $0.8\lambda$ for the cladding there would be twice the error in cladding thickness as there would be for the $0.4\lambda$ cladding thickness and the pit error would also be larger. The end result would be excessive error in the vertical location of the cladding penetration state. For this reason, Bragg gratings, which necessitate at least three layers of $0.25\lambda$ with alternating index of refraction, are impractical for CRTR claddings, and cladding thickness below half wavelength, and even below quarter wavelength is desired while cladding thickness of 0.75 wavelength and above is undesirable using current construction technology. In metal cladding, the desired cladding thickness is in order of the penetration depth.

A phased array antenna is an antenna composed of a plurality of radiating elements being fed via phase controller which allows changing the phase between different antennas for transmitting antenna, and measuring phase difference between received signals. During transmit operations, beams are formed by shifting the phase of the signal emitted from each radiating element, to provide constructive/destructive interference so as to steer the beams in the desired direction. Phased arrays are common in the radar field, but have applications elsewhere. When mounted on a moving platform phased arrays are often used to form Synthetic Aperture Radar (SAR) which provides high resolution by repeated 'illumination' of a target by pulses and synthetically computing a model of the scanned target.

As CRTRs may be used well into the EHF range, and possibly even for longer waves, they act as an antenna either for transmission or for reception, as well as for mixing signals. However in the range of visible and UV imaging, the ability for fine control of a very narrow beam of light is utilized in many applications such as semiconductor manufacturing, scanning microscopes, and the like. The added capability of the CRTR to control multiple polarizations further assists in providing finer control of the beam characteristics, including, by way of example, utilizing interference differing between different polarizations. Thus the CRTR based phased array antenna is useful throughout the range of millimeter waves well into the UV range.

CRTRs may be utilized as a general purpose antenna that has excellent noise figure and improved anti-jamming as those characteristics are determined at the front end of receivers. Furthermore, at the microwave/millimeters wave range material selection is dramatically increased. Most materials have frequency dependent dielectric constant, which is high in the IR, EHF, and microwave range, but this dielectric constant drops rapidly at the visual and near IR domains. By way of example, water has an index of refraction of nearly 10 at radio frequencies but only 1.5 at IR to UV. There are numerous optical materials with low and high index at millimeter wave frequencies and below. Thus while the principles of operation of the CRTR are the same as for the optical domain, the materials and sizes differ, and manufacturing is easier. CRTR based phased array antennas offer advantages, as described above, in many areas such as communications by narrow beam, designation of a target with visible or invisible light, to photolithography of nanometer sized features.

FIG. 10 depicts a portion of a larger array operating as a phased array antenna. Firstly, separators 77 isolate each CRTR from other CRTRs so that each CRTR 902, 903, 904, operates as an independent radiating element. A transmitting antenna is described, but a receiving antenna will operate similarly if receivers are utilized. Radiating source type EL transducers 1101, 1102, and 1103 couple energy of a first frequency via the cladding into the respective CRTR core. Phase controller 11600 controls the relative phase of signals going to the radiating sources, and thus the phase of the signals emitted from each individual CRTR. As known, the phase difference causes the beam emitted from the CRTR array to have a direction that may be modified by controlling the phase difference between individual elements. Beam forming and shaping by changing phase and/or intensity relationship between a plurality of transmitting elements is well known in phased array antennas.

Optionally radiating source transducers such as 1120, 1121, and 1122 couple energy at a second frequency via the cladding into the respective CRTR core. As the CRTR is capable of mixing signals of very broad band, the antenna array can be used to send more than one beam and steer the beams individually. Those beams may be formed sequentially or simultaneously.

Thus each CRTR and its associated transducers form a versatile transmitting element, and the array can steer a beam emitted form that antenna by the phase controller. Notable, when configured for receiving operation by having LE type transducers coupled to the CRTRs, the phased array antenna can provide information regarding the direction of incoming signals using similar techniques, by observing the phase differences and/or intensities, rather than by transmitting. The phase controller 11600 therefore is substituted with a signal processor.

The transducers may be of any desired type, and frequency befitting the task at hand, including laser, EHF, microwave, visible light, UV light, and the like. As stated above, transducers may be placed so as to receive radiant energy entering the CRTRs, forming a receiving antenna, where the receiving direction is detected by the relative phase of signals received from a plurality of CRTRs. While most phased array antennas operate best at a specific frequency and its harmonic, the broad-band nature of the CRTR allows a phased array receiving antenna of very broad spectrum. Such antenna is very useful for signal intelligence gathering.

Notably, radiant sources may also a plurality of lasers, which will allow directing a laser beam to a desired direction, at high intensity due to constructive interference.

A receiving CRTR operating with a plurality of transducers in varying depths forms a channelized filter integrated into a horn antenna wherein the channelized ports are lateral to the horn and the tip exit port is a high pass filtered output for a broad band input. Therefore the CRTR acts not merely as a side fed horn antenna, but taking the signal from each transducer allows handling of sub-bands separately, reducing noise and increasing antenna merit. Therefore, there is provided a front end for electromagnetic radiant energy receiver, comprising at least one, and preferably a plurality of CRTR's having a plurality of transducers arranged to receive differing frequency bands. Each of the transducers of a single CRTR forms a channel of a predetermined frequency band. If a plurality of CRTRs are used in combination, respective members of the plurality of transducers may be coupled together.

FIG. 10A depicts a cross-section of a tapered core 905 for a CRTR, showing an optional center member 906 extending along the depth dimension. The member may comprise a different material than the core, or may form a void. In certain embodiments such member allows an increase in the core diameter, which eases manufacturing. The member may be formed prior to creating the core by filling, deposition, material removal, and the like.

Figure 11A:
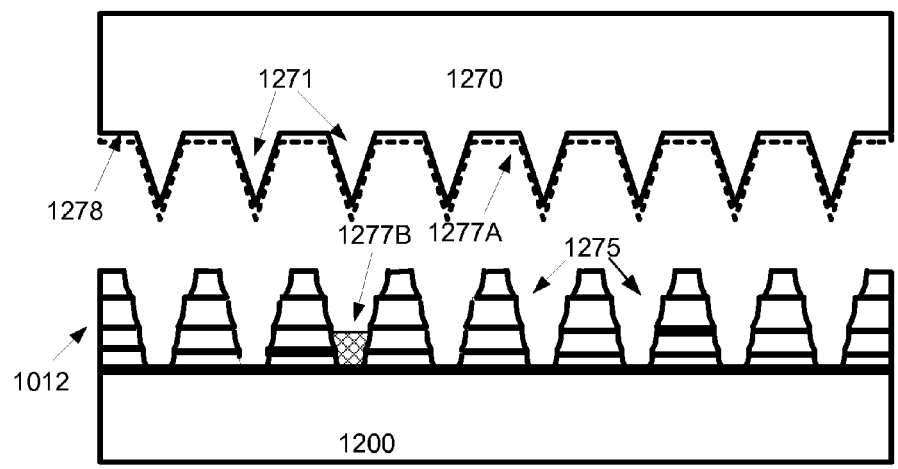
Figure 11B:
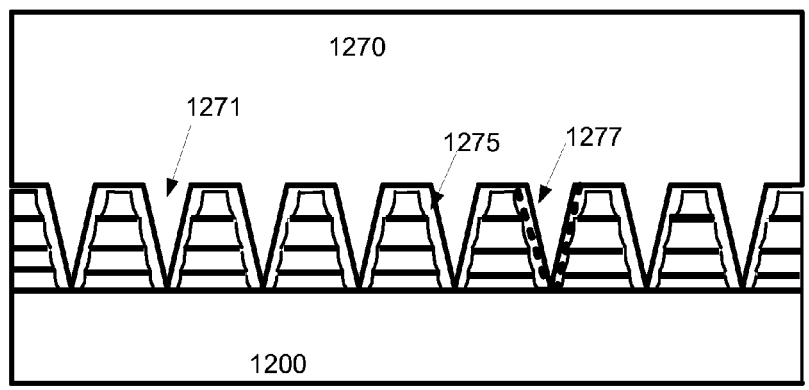
Figure 11C:
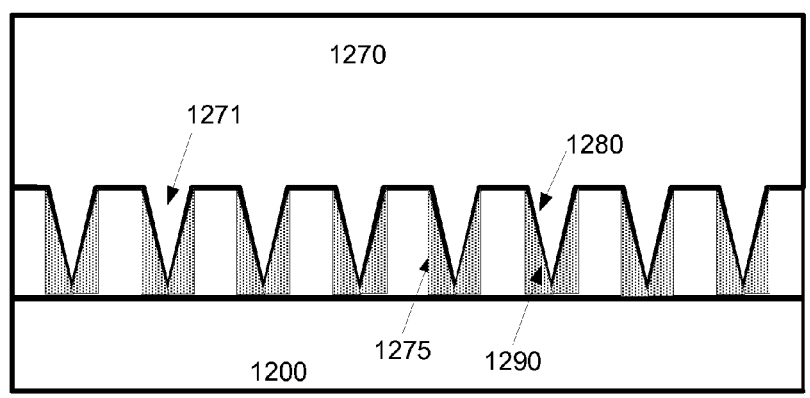

FIGS. 11A, 11B, and 11C depict a manufacturing method for the CRTRs. The method accommodates relatively imprecise etching of the CRTR outer dimensions which is done by any desired method, such as wet etch, plasma etch, reactive ion etch, "Lithography, Electroplating, and Molding" (Colloquially known as LIGA—Lithographie, Galvanoformung, Abformung), ion milling, laser etch, and the like. A stratum 1012 is deposited over substrate 1200. The stratum may be formed with lateral waveguides as shown, or as a slab stratum. Optionally other layers such as protective cap layer, buffer layers, and the like, are also deposited. The stratum is etched with pits 1275 defining the CRTR outer shapes. The term pits in this context are the voids in the stratum into which the CRTR's are created or placed, including the cladding and the cores.

A stamp 1270 having protrusions 1271 corresponding to the CRTR cores is provided for insertion into the pits in the stratum, as shown in FIG. 11B. In one optional embodiment, a filler dielectric material 1277B is disposed within the pits, and the stamp is aligned and inserted such that the pits and the protrusions are in registration. The cladding material is displaced into the desired shape by the insertion of the stamp.

In other embodiments the stamp protrusions 127 are first covered with dielectric material 1277A. The stamp is then inserted aligned and inserted such that the protrusions and the pits are in registration.

In some embodiments the stamp is aligned and inserted as described, and cladding material is flowed into the pits, filling the spaces between the pits and the stamp. The cladding material may then be cured in place if desired. Regardless of the placement method, the goal is to place the dielectric material within the pits between the stratum and the protrusions. Thus the dielectric material 1277A, 1277B, or the flowed material described above, shall all be related to as numeral 1277. FIGS. 11B and 11C show the stratum and the stamp after mating.

The dielectric material may comprise a UV curable material, a thermoset polymer, a self-curing polymer, a glass, a dielectric fluid, optionally including gas or air, and the like. In some embodiments, the dielectric material itself forms the cladding, while in other embodiments it acts only as an intermediary, or a portion of the cladding. In embodiments were the dielectric described above is an intermediate material, the protrusions may be coated with the cladding, which may be made of thin and/or perforated metal, or another dielectric material, and then dielectric material 1277 is disposed as described above.

Optionally, the cladding material comprises a powder and the process is performed at a temperature in which the powder flows about the stamp. Alternatively, the stamp is heated to melt the powder.

In some embodiments, the dielectric material 1277 planarizes the imprecise formation of the etched pits 1275.

In certain embodiments the stamp, or a portion thereof, is made of radiant energy transmissive material while in other embodiments the stamp is withdrawn and core materials is deposited at the voids where the protrusion existed when the stamp and stratum were mated. In embodiments where the stamp 1270 is left in the device, it may also be formed to any desired shape to accommodate the intended use of the device. Thus the stamp may form structure such as a protective layer, anti-reflective layer, collimation layer having collimators place on top of the CRTR's apertures, concentrators, mirrors, lenses, and the like. When a stamp is left in the device, it may be referred to as a cover, as it provides a cover to the stratum, and optionally also acts as a sealant to fluid that may be utilized for the cladding.

This construction allows for a wide variety of techniques and materials for depositing the cladding materials. In some embodiments a fluid is used as the cladding, and the stamp acts as a seal, while the protrusions serve as the CRTR cores. In embodiments where the cladding is UV curable, the UV may be applied via the stamp. Dies and jigs may be used to facilitate the alignment process.

FIG. 11C depicts a cross-section of CRTRs formed after the stamp and the stratum has been mated. However this embodiment depicts certain optional feature. First, it depicts the option where for ease of manufacturing, the pits 1275 are formed larger than the size necessitated by the outer dimension of the cladding, if the cladding follows the tapered core. Doing so allows higher manufacturing tolerance as the pits may be made larger, and in some embodiments may be made vertical, near vertical, or, as commonly happens during etching, have scalloped walls. Further optionally, an intermediate material 1290 may be disposed within the pits. The cladding 1277 may in such embodiment be disposed on the stamp protrusions 1271, which is advantageous for embodiments where the cladding is metallic, but can also be applied to dielectric material. The stamp and stratum are aligned and joined. In some embodiments the intermediate material is hardened after the mating. In certain embodiment the intermediate material is a fluid.

The stamp based embodiment offers several additional options. In one embodiments, the cladding is made thicker to fill all the space between the core and the pit wall. Such embodiment may require a dipper pit, as the path of the light refracted from the CRTR core would be angled downward and will take longer distance to reach the transducer. In such case material 1290 would be the actual cladding material. In certain other embodiments the intermediate material may act as an insulator to prevent shorting of the lateral waveguides by a metallic cladding 1280.

Figure 11D:
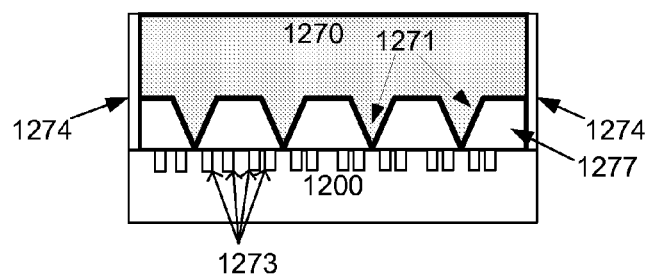

FIG. 11D is a detail cross-section of the optional method of creating CRTRs using a stamp. This example utilizes a slab stratum. A plurality of transducers 1273 is formed on a substrate 1200. The substrate has optional sidewall or walls 1274 which extend above the substrate, and is formed to receive the stamp therein. The optional sidewalls form a retaining wall for cladding material. The stamp 1270 has a plurality of protrusions 1271 projecting therefrom, the protrusions being dimensioned as CRTR cores, and will indeed become the CRTR core if the stamp material is transparent to the intended radiant energy, and the stamp becomes integral to the device. Cladding material 1277 is disposed on the substrate, and the stamp is mated with the substrate. When the stamp is placed on the substrate, it displaces the cladding material. In an optional embodiment, the stamp is disposed on top of the substrate, and the cladding material is flowed into the spaces between the stamp and substrate. In both methods, the cladding material may be hardened or it may be a fluid. The optional side walls 1274 serve to hold fluid cladding material if used, to facilitate alignment of the stamp, and in some embodiment form a seal to prevent escape of cladding material. By utilizing this method the CRTR is formed in a slab type stratum, which is created by the cladding material 1277. The transducers 1273 are disposed about each core, to receive radiant energy emanating therefrome. If the cladding material is hardenable, as described for embodiments above, the side walls may not be required after the hardening. In such construction the sidewalls may be separate from the structure as a whole. The skilled in the art would recognize that the cladding material may be applied to the stamp rather than the substrate, and that the side walls, if utilized, may be applied to the stamp as well.

Core materials and cladding materials may comprise a plurality of materials as desired to change the refractive index or other light propagation and guiding characteristics of the structure as a whole. By way of non-limiting example, the core material may comprise layers of material with varying light propagation speeds, which may drastically alter the physical profile of the CRTR core, while maintaining the desired taper with respect to wave propagation therein.

In one particular embodiment, the stamp/cover comprises a lens, or is formed as a lens after production of the CRTR's. Such lens would serve to capture light and other radiant energy and bring it to focus at plane of the CRTR apertures, or an extension thereof. By way of example, FIG. 12 depicts an embodiment where the stamp/cover is formed to act as a lens, with an outer surface 1291, while having the CRTR cores 1271 being formed on the opposite surface. The pits 1275 are formed on the substrate 1200, the stamp is aligned and inserted into the CRTR pits 1275, and the space between the cores and the stratum is filled with the cladding material by one of the methods described above.

In some embodiments lens 1270 has planarization surface 2905 and electrical interconnects 2925 connecting to electrical connections 2930 on substrate or die 1200. Optional encapsulant or package body (not shown) completes an electronic package for the device. The lens may form a portion of a larger optical system.

Thus, in certain embodiments, there is provided an array comprising a plurality of CRTRs which may be operated as splitters, combiners, reflective, or hybrid CRTRs. The array comprising a stratum having a plurality of pits formed therein, the pits being defined by pit walls, at least some of the pits being dimensioned to receive therein at least a portion of the core and cladding of a CRTR. A cover transmissive of radiant energy within a spectral range of interest of the device, has a plurality of protrusions extending therefrom, at least one of the protrusions being dimensioned to act as the core of at least one of the plurality of CRTRs, is disposed in registration with a pit. A cladding is disposed between the protrusion and at least one of the walls of the respective pit, such that the protrusion acts as a core to the CRT formed in combination with the cladding.

Generally, in the creation of CRTRs, for the cladding, core, and intermediate material if one is used, it is permissible to use air, inert gas, or a cooling liquid of controlled dielectric constant and sufficiently low optical absorbance. Perfluoropolyether and fluoroalkane liquids have very reproducible properties, excellent optical transparency, low viscosity and good wetting to hydrophobic metals. Mixtures of related fluids may be used to tune the dielectric constant in operation. These materials have excellent heat transfer properties and could be used to remove excess heat by flowing in the z-direction along defined ridges if the etched regions form long slots.

Both low-k and high-k solid dielectrics are also suitable to the metal clad system; dielectric cladding favors low-k solids such as aluminum oxide, silicon dioxide, or polymers for the cladding and high-k transparent materials for the core. Water and other aqueous liquids allow the same fluid cooled system while using an alcohol/water or other suitable mixture to continuously adjust the dielectric constant of the core. Hafnium oxide is a well-known high-k material from the semiconductor industry.

With respect to the CRTR, the term "tip" denotes the end opposite the aperture, which is commonly the narrow end of the CRTR core. The tip may be flat, tapered to a point, rounded, cylindrical, or having any desired shape. The tip may even extend to a broad end, after narrowing down. In such case the tip is considered the narrowest point in the waveguide.

Lately, stereoscopic displays appear in many devices. Such displays provide an illusion of three dimensional objects and are colloquially known as "3D displays", or 3 dimensional displays. It is noted that those devices are not truly three dimensional, but create the three dimensional illusion at the viewer's brain. The skilled in the art would recognize that the CRTRs in general, and most specifically CRTRs acting as mixers, will offer significant advantages to regular displays as well as to three dimensional displays. For two dimensional displays the CRTR offer unique advantages in the field of micro displays, such as wearable displays and the like. For stereoscopic displays the CRTR offers the advantage of allowing two separate signals to be emitted, each with its own polarization. A plurality of CRTRs operating in mixer mode, in combinations with respective plurality of controllable light sources will create a display. If the light sources are disposed to provide polarization information a 3D display is formed. 3D display of this type will be very compact and present multiple advantage over the present complex construction. In both 2D and 3D embodiments, the display will provide high efficiency and very small pixel size. Furthermore, the stacked nature of the lateral guides offers simplified wiring as the space between the lateral waveguides may be utilized for wiring each individual layer.

As different embodiments of the present invention is applicable to many roles, applications, and functions, and as the structures at the base of the invention cover a broad spectrum of electromagnetic radiation, it is recognized that different disciplines often use different terms for items that would represent similar concepts in differing fields. This broad applicability points for a need to use words that depart somewhat from the strict common usage in a specific field, yet such terms are either be well defined in the specifications, or will be clear to the skilled in the art by analogy, and in light of the teachings provided hereinabove. By way of example these specifications uses terms such as electromagnetic radiation and radiant energy interchangeably. Similarly, the term 'refractor' and 'splitter' or 'spectral splitter' will be used interchangeably, as well as 'mixer' and 'combiner'. Certain expressions, such as for example the term 'refractor' denotes a device which imparts an angle change to radiant energy, regardless of specific mechanisms, whether they relate to light or to any other part of the spectrum, and regardless of the specific mechanism utilized to impart that angle change. The term 'polychromatic', 'multi-frequency' and 'mixed frequency' are also be used interchangeably, and denote an electromagnetic energy which comprises a plurality of spectral components. The electromagnetic energy components may be spectral components, i.e., components of different frequencies. Alternatively or additionally, the electromagnetic wave components may be of different polarizations, whether or not of differing frequencies. Notably, the terms extend throughout the spectral range of interest.

A basic building block of most embodiments of the present invention involves a waveguide having a tapered core. The terms 'tapered core waveguide' and 'tapered waveguide' are used interchangeably. While the waveguide including the cladding may be tapered, the requirement for that building block is for the at least the core to be tapered. Furthermore, the term "tapering" and "taper" should be construed that the taper may have different widths at different locations, or stated differently, that the width of the core in at least one direction, changes as a function of depth. The term taper denotes more than a pure linear taper, i.e. a straight line connecting two points on the base and tip as seen in a cone. For example, in some embodiments, the core width monotonically decreases as one proceeds from a wider base to a narrower tip, while in other embodiments other functions may be utilized such as stepped function, logarithmic function, or any other desired function. Furthermore, the width may vary to different extent within a single depth, as seen for example in the cores depicted in FIG. 8. The term substantially implies that the associated condition or limitation is fulfilled within tolerances which permit operation as described. By way of example, while a certain component may be described as transverse, or being at 90 degrees to another, the skilled in the art would recognize that certain tolerance exists and that as long as the purpose of the limitation is served within such tolerance, the component or limitation is considered fulfilled.

Note, however, that use of the foregoing and similar terms of art should not be construed as necessarily limiting all embodiments to modes of operation suggested by the strict technical senses of the terms employed. The novel nature of the invention necessitate certain lexicographical freedoms to describe a structure and limitations. The skilled in the art would readily recognize the proper application of these specifications when taken as a whole, and in light of common knowledge and the state of the art. Various modes of the invention will become apparent in light of these specifications, and all such variations in which these terms are used should be considered within the scope of the invention.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. A tapered core waveguide and stratum assembly, comprising:
   a stratum having a top and bottom surfaces and comprising a plurality of superposed waveguides, at least one of the plurality of waveguides having at least a first transducer disposed therein;
   a tapered core waveguide disposed at least partially within the stratum, the tapered core waveguide comprising a core having a refractive index, and a first end and a second end, the first end defining an aperture, the core having a depth direction extending between the first end and the second end, and substantially perpendicular to the stratum top surface, wherein the depth magnitude increases with distance from the first end towards the second end, and from the top surface towards the bottom surface of the stratum;
   the core having a plurality of width planes transverse to the depth direction, each plane having at least one width dimension lying in the width plane;
   the width dimension decreasing in magnitude in at least one direction, as a function of the depth such that the width magnitude at the aperture is higher than the width magnitude at the second end;
   a cladding disposed at least partially around the core, the cladding having a refractive index lower than the core refractive index;
   wherein the first end of the core is dimensioned to allow passage of radiant energy having at least a first and a second spectral components having frequencies associated therewith, and wherein the core is dimensioned at least in a respective width dimension such that the first spectral component would reach a cladding penetration state at a first location and the second spectral component would reach a cladding penetration state at a second location, different from the first location.

2. An assembly as claimed in claim 1, wherein the first the frequency associated with the first spectral component is lower than the frequency associated by the second spectral component, the first transducer is a radiant energy to electrical energy (LE type) transducer, the first location is at a lower depth than the second location, and wherein at least two of the plurality of superposed waveguides are disposed to receive the first and second spectral components respectively.

3. An assembly as claimed in claim 1, wherein
   the tapered core is asymmetric, or having symmetrically multifaceted cross-section in at least one width plane; and,
   the first location and the second location form an angle therebetween when projected on a width plane.

4. An assembly as claimed in claim 1, wherein the at least one transducer is a reflective type (RL) transducer disposed in the at least one superposed waveguide to controllably reflect at least a portion of the first spectral components via the cladding into the core.

5. An assembly as claimed in claim 1, wherein the first transducer is a radiant energy source, and further comprising at least a second radiant energy source disposed within at least one of the plurality of superposed waveguides, to couple energy emitted from the energy sources to the core via the cladding.

6. An assembly as claimed in claim 1, wherein the tapered core is asymmetric, or having symmetrically multifaceted cross-section, at a width plane.

7. An assembly as claimed in claim 1, wherein the first transducer is an LE type transducer, and wherein at least one of the superposed waveguides having an electrically conductive cladding.

8. An assembly as claimed in claim 1, the first transducer is an LE type transducer, and wherein the aperture is constructed as an elongated wedge.

9. An assembly as claimed in claim 1, wherein the first and second spectral components has different frequencies associated therewith, at least two of the superposed waveguides are disposed to receive the first and second spectral components respectively, and each of the at least two superposed waveguides having at least one transducer disposed therein, each of the respective transducers being an LE type transducer optimized for the frequency of the spectral component received by the respective waveguide.

10. An assembly as claimed in claim 1, wherein the cladding of the tapered waveguide has a thickness which does not exceed half a wavelength of at least one spectral component admitted via the aperture, at or about the cladding penetration depth of the at least one spectral component.

11. An assembly as claimed in claim 1, wherein the core or the cladding of the tapered waveguide comprises a liquid.

12. An assembly as claimed in claim 1, wherein the cladding of the tapered waveguide comprises metal having a thickness in the order of, or lower than, the skin penetration depth for at least one spectral component admitted via the aperture, at or about the cladding penetration depth of the spectral component.

13. An assembly as claimed in claim 1, further comprising a plurality of tapered core waveguides disposed at least partially in the stratum, the assembly further comprising at least one lens disposed over the apertures of the plurality of tapered core waveguides, wherein the apertures of the plurality of tapered core waveguides lie substantially on a focal plane of the lens.

14. An assembly as claimed in claim 1, wherein the stratum outer surface closest to the aperture of the plurality of tapered core waveguides comprises metal.

15. An assembly as claimed in claim 1, further comprising a second transducer disposed in the same one of the superposed waveguides having the first transducer, the first and second transducers are LE type or RL type transducers, disposed at an angle therebetween to receive the first spectral component and a second spectral component in the first and second transducers, respectively.

16. A spectral combiner and stratum assembly comprising:
    a stratum having a top and bottom surfaces and comprising a plurality of superposed waveguides;
    a tapered core waveguide disposed at least partially in the within the stratum, the tapered core waveguide comprising a core having a first end and a second end, the first end defining an aperture, the core having a depth direction extending between the first end and the second end and substantially perpendicular to the stratum top surface, wherein the depth magnitude increases with distance from the first end towards the second end, and from the top surface towards the bottom surface of the stratum;
    the core having a width dimension in at least one direction substantially transverse to the depth direction;
    the core width decreasing in magnitude in at least one direction, as a function of the depth such that the width magnitude at the aperture is higher than the width magnitude at the second end;
    a cladding disposed at least partially around the core;
    at least a first and a second radiant energy sources disposed within at least one of the superposed waveguides for coupling energy emitted from the energy sources to the tapered core via the cladding thereof, wherein the energy emitted from the energy sources is coupled into the core at a respective coupling depth where a spectral component admitted via the aperture and having similar frequency to the frequency of the respective radiant energy source would reach cladding penetration state.

17. An assembly as claimed in claim 16, wherein the first and the second radiant energy sources are disposed at different superposed waveguides.

18. A spectral combiner as claimed in claim 16, wherein the core is multifaceted, and wherein the first and the second energy sources are disposed at an angle therebetween relative to the core.

19. An assembly as claimed in claim 18, wherein the first and second energy sources are disposed at different waveguides of the plurality of superposed waveguides.

20. A reflective structure comprising:
    a stratum having a top and bottom surfaces and comprising a plurality of superposed waveguides;
    a tapered waveguide core having a first end and a second end, the first end defining an aperture, the core having a depth direction extending between the first end and the second end and substantially perpendicular to the stratum top surface, wherein the depth magnitude increases with distance from the first end towards the second end, and from the top surface towards the bottom surface of the stratum;
    the core having a width dimension in at least one direction transverse to the depth direction;
    the core width decreasing in magnitude in at least one direction, as a function of the depth such that the width magnitude at the aperture is higher than the width magnitude at the second end;
    a cladding disposed at least partially around the core;
    wherein the first end of the core is dimensioned to allow passage of radiant energy comprising an admitted spectral component having a frequency associated therewith;
    wherein the varying width of the core resulting in the spectral component reaching a state at which it will penetrate the cladding and exit the waveguide via the cladding, at a frequency dependent depth; and,
    at least one transducer disposed within at least one of the superposed waveguides, for controllably reflecting at least a portion of the admitted spectral components via the cladding into the core.

* * * * *